United States Patent
Inoue et al.

(10) Patent No.: US 12,541,046 B2
(45) Date of Patent: Feb. 3, 2026

(54) BLACK RESIN COMPOSITION, NEAR INFRARED RAY-TRANSMITTING LIGHT-BLOCKING MEMBRANE, DECORATIVE SUBSTRATE, DECORATIVE FILM AND COLORED PARTITION WALL FOR ORGANIC EL DISPLAY

(71) Applicant: Toray Industries, Inc., Tokyo (JP)

(72) Inventors: Yoshihiko Inoue, Otsu (JP); Kazuki Nanbu, Otsu (JP); Takuto Tokuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 762 days.

(21) Appl. No.: 17/800,632

(22) PCT Filed: Feb. 16, 2021

(86) PCT No.: PCT/JP2021/005608
§ 371 (c)(1),
(2) Date: Aug. 18, 2022

(87) PCT Pub. No.: WO2021/172084
PCT Pub. Date: Sep. 2, 2021

(65) Prior Publication Data
US 2023/0348748 A1    Nov. 2, 2023

(30) Foreign Application Priority Data
Feb. 25, 2020    (JP) .................. 2020-029052

(51) Int. Cl.
*G02B 5/22*    (2006.01)
*C08F 222/10*    (2006.01)
(Continued)

(52) U.S. Cl.
CPC ............ *G02B 5/223* (2013.01); *C08F 222/10* (2013.01); *C09D 5/035* (2013.01); *C09D 7/20* (2018.01);
(Continued)

(58) Field of Classification Search
CPC ........ G02F 1/133512; C09K 2323/031; H10K 59/8792; G02B 5/223
See application file for complete search history.

(56) References Cited

U.S. PATENT DOCUMENTS 8,329,068 B2    12/2012    Inoue et al.
9,599,894 B2    3/2017    Lee et al.
(Continued)

FOREIGN PATENT DOCUMENTS

CN    115151846 B  * 10/2023  ......... H10K 59/8792
JP    3120476 B2    12/2000
(Continued)

OTHER PUBLICATIONS

International Search Report and Written Opinion for International Application No. PCT/JP2021/005608, dated May 11, 2021, 7 pages.

Primary Examiner — Sophie Hon
(74) Attorney, Agent, or Firm — Buchanan Ingersoll & Rooney PC

(57) ABSTRACT

A black resin composition is provided that presents an achromatic reflected color tone, has a high visible-light-blocking ability and a high near-infrared penetrability, and exhibits a smaller amount of transmitted scattered light, where the black resin composition includes (A) a resin, (B) a colorant, and (C) an organic solvent, wherein the black composition includes a red pigment and a blue pigment as (B) the colorant, wherein amount of the red pigment is 20 to 80 wt % with respect to the total amount of (B) the colorant, and wherein crystalline size of the red pigment in a colored (Continued)

film composed of a cured product of the black resin composition is 5 nm or more and 25 nm or less, as calculated from a half bandwidth determined from a main peak of an X-ray diffraction spectrum obtained using CuKα rays as an X-ray source.

15 Claims, 1 Drawing Sheet

(51) Int. Cl.
- C09D 5/03 (2006.01)
- C09D 7/20 (2018.01)
- C09D 7/61 (2018.01)
- C09D 135/06 (2006.01)
- H10K 59/80 (2023.01)

(52) U.S. Cl.
CPC .............. *C09D 7/61* (2018.01); *C09D 135/06* (2013.01); *H10K 59/8792* (2023.02); *C09K 2323/031* (2020.08)

(56) References Cited

U.S. PATENT DOCUMENTS

| | | | |
|---|---|---|---|
| 2009/0085016 A1 | 4/2009 | Weng et al. | |
| 2016/0282716 A1* | 9/2016 | Lee | G02B 5/208 |
| 2017/0276846 A1 | 9/2017 | Ishido et al. | |
| 2021/0115219 A1 | 4/2021 | Inoue et al. | |

FOREIGN PATENT DOCUMENTS

| | | | | |
|---|---|---|---|---|
| JP | 2008260927 A | | 10/2008 | |
| JP | 2009058946 A | | 3/2009 | |
| JP | 2009191244 A | | 8/2009 | |
| JP | 2010156804 A | * | 7/2010 | |
| JP | 2013205474 A | | 10/2013 | |
| JP | 2015110691 A | | 6/2015 | |
| JP | 2016188994 A | | 11/2016 | |
| JP | 2016191729 A | | 11/2016 | |
| JP | 2018169539 A | | 11/2018 | |
| JP | 7111250 B2 | * | 8/2022 | ............. G02B 5/223 |
| TW | I875962 B | * | 3/2025 | ......... H10K 59/8792 |
| WO | 2012157222 A1 | | 11/2012 | |
| WO | 2016098810 A1 | | 6/2016 | |
| WO | 2019059359 A1 | | 3/2019 | |

* cited by examiner

BLACK RESIN COMPOSITION, NEAR INFRARED RAY-TRANSMITTING LIGHT-BLOCKING MEMBRANE, DECORATIVE SUBSTRATE, DECORATIVE FILM AND COLORED PARTITION WALL FOR ORGANIC EL DISPLAY

CROSS REFERENCE TO RELATED APPLICATIONS

This application is the U.S. National Phase application of PCT/JP2021/005608, filed Feb. 16, 2021, which claims priority to Japanese Patent Application No. 2020-029052, filed Feb. 25, 2020, the disclosures of these applications being incorporated herein by reference in their entireties for all purposes.

FIELD OF THE INVENTION

The present invention relates to a black resin composition, a near-infrared-transmitting light-blocking film, a decorative substrate, a decorative film, and a colored partition wall for an organic EL display.

BACKGROUND OF THE INVENTION

In recent years, various information terminals such as smartphones and tablet PCs have been available with various kinds of biometrics to be used for security reinforcement. In addition to conventional fingerprint recognition, face recognition, iris recognition, and the like are being studied, and such face recognition or iris recognition is based on the use of a near-infrared sensor or a near-infrared camera. Also in an automobile, a near-infrared sensor such as a motion sensor in an on-vehicle display, a near-infrared camera such as a driver monitoring camera, and an infrared laser sensor serving for LiDAR (Light Ditection and Ranging) as a sensor for a driving space are used.

The above-mentioned near-infrared sensor or near-infrared camera is generally arranged on the periphery of a display or a housing, and conventionally covered with a transparent or translucent cover, and thus, such a near-infrared sensor or near-infrared camera is visually recognizable from the outside, posing a problem in that the design is spoiled. What is being studied in view of this is a filter or a coating material by which the near-infrared sensor or the near-infrared camera is hidden on the basis of the penetration of near-infrared rays and the decrease of visible-light transmittance. When used as a colorant, a dye that is used conventionally and generally exhibits a sufficiently high infrared-ray transmittance, but is problematic in that the dye has insufficient light resistance, and that the optical properties are degraded over time.

In view of this, studies are being made, for example, as follows: a laminate including at least a support and a functional layer provided on the support, wherein the functional layer includes at least metal fine particles or semimetal fine particles that have an average dispersion particle diameter of 1 to 100 nm and can transmit light in the infrared region and hide light in the visible wavelength region, an organic substance that can be fired and removed, and a glass powder (see, for example, Patent Literature 1); an optical filter characterized by including a structure containing green coloring matter and black coloring matter, having an average light transmittance of 2% or less in the wavelength range of from 400 to 730 nm, and having a continuous 50 nm wavelength range having an average transmittance of 80% or more within the wavelength range of from 800 to 1000 nm (see, for example, Patent Literature 2); and the like.

Another study being made is on using a material made pseudo-black by mixing a red pigment and a blue pigment to form a black frame that transmits infrared rays (see, for example, Patent Literature 3 and Patent Literature 4).

PATENT LITERATURE

Patent Literature 1: JP 2016-191729 A
Patent Literature 2: WO2016/098810
Patent Literature 3: WO2012/157222
Patent Literature 4: JP 2018-169539 A

SUMMARY OF THE INVENTION

In technologies that are described in Patent Literature 1 to 4 and involve using metal fine particles, an organic coloring pigment, and an organic black pigment, the light resistance is good, but it is difficult to achieve both visible-light blocking and near-infrared-ray penetration, and in particular, there is a problem in that light scattering due to the particles significantly decreases the image resolution of a near-infrared camera. In addition, no study has been made on the reflected color tone of the film used as a light-blocking film, and the degree of jet-black is insufficient, hence posing a problem in that the design of the film used as a decorative film is insufficient.

In view of this, an object of the present invention is to provide a black resin composition that has excellent light resistance, has a high visible-light-blocking ability and a high near-infrared penetrability, transmits less scattered light, and furthermore presents an excellent color tone of reflected light.

The present inventors have made a study vigorously, and as a result, have completed the present invention through the discovery that the above-mentioned problems can be solved by making a pseudo-black color using at least a red pigment and a blue pigment as colorants for a black resin composition, and bringing, within a specific range, the crystalline size of the red pigment in the black resin composition. That is, the black resin composition contains (A) a resin, (B) a colorant, and (C) an organic solvent, wherein amount of a red pigment is 20 to 80 wt % with respect to the total amount of (B) the colorant, and wherein crystalline size of the red pigment in a colored film composed of a cured product of the black resin composition is 5 nm or more and 25 nm or less, as calculated from a half bandwidth determined from a main peak of an X-ray diffraction spectrum obtained using CuKα rays as an X-ray source.

A black resin composition according to the present invention has an excellent light penetrability in the near-infrared region (having a wavelength of 800 to 1000 nm) and an excellent light-blocking ability in the visible wavelength region, and makes it possible to decrease transmitted scattered light. A black resin composition according to the present invention makes it possible to obtain an excellent near-infrared camera image and to obtain a black film having an achromatic reflected color tone and having a good design.

DETAILED DESCRIPTION OF EMBODIMENTS OF THE INVENTION

Figure 1:
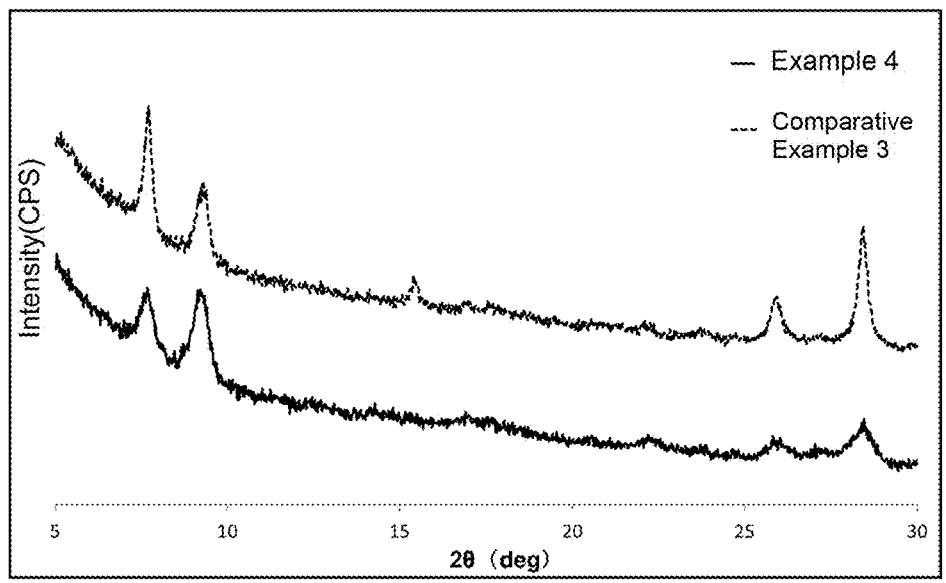
FIG. 1 is an X-ray diffraction profile of each of the colored films given in Example 4 and Comparative Example 3.

A black resin composition according to the present invention includes (A) a resin, (B) a colorant, and (C) an organic solvent.

(A) the resin has the effect of serving as a binder in the composition, (B) the colorant has the effect of blocking visible light, and (C) the organic solvent has an effect of dissolving or dispersing (A) the resin and/or (B) the colorant uniformly. The present invention is characterized by containing a red pigment and a blue pigment as (B) the colorant, wherein the crystalline size of the red pigment in a colored film composed of a cured product of the black resin composition is 5 nm or more and 25 nm or less as determined from the half bandwidth of the main peak of an X-ray diffraction spectrum obtained using CuKα rays as an X-ray source. Here, the red pigment is contained in a larger amount than the blue pigment. Additionally, in cases where a pigment of another color is contained, the red pigment (the main pigment) is preferably contained in a larger amount than the pigment of another color. Additionally, the blue pigment (the sub pigment) is preferably contained in a larger amount than the pigment of another color in cases where the pigment of another color is contained. For (B) the colorant, a red pigment and a blue pigment are selected from among pigments having excellent light resistance, and used to present a pseudo-black in order to have both a high near-infrared penetrability and a high visible-light-blocking ability. In addition, the red pigment is dispersed in a resin composition and a colored film in such a manner that the red pigment has a specific crystalline size. In this manner, it is made possible to block visible light, and at the same time, to enhance the near-infrared penetrability significantly. In addition, transmitted light can be inhibited from scattering, thus making it possible to inhibit near-infrared scattered light and obtain a clear near-infrared camera image via the colored film. Furthermore, atomizing a red pigment having a strong absorption in the visible wavelength region having high luminous efficiency makes it possible to decrease diffused reflected light, and makes it possible to present a more achromatic reflected color tone.

Examples of a resin to be used as (A) the resin include epoxy resins, acrylic resins, cardo resins, siloxane resins, polyimide resins, polyimide precursors, polyamide resins, novolac resins, urethane resins, polyester resins, vinyl chloride resins, vinyl acetate resins, copolymer resins of vinyl chloride and vinyl acetate, chlorinated polypropylene resins, siloxane resins, nitrocellulose, cyclized rubbers, chlorinated rubbers, rosins, rosin derivatives, and the like. It is possible to contain two or more of these. Among these, acrylic resins, polyimide resins, urethane resins, and siloxane resins are preferable from the viewpoints of the storage stability of the black resin composition and the heat resistance of the colored film.

A black resin composition according to the present invention may or may not be photosensitive. Using an alkali-soluble resin as (A) the resin and further containing the below-mentioned (D) photosensitizer makes it possible to make the black resin composition photosensitive. Here, an alkali-soluble resin in the present invention refers to a resin having a hydroxyl group and/or a carboxyl group as an alkali-soluble group, having an acid value of 10 mgKOH/g or more, and having a weight-average molecular weight (Mw) of 500 or more and 150,000 or less. Here, the weight-average molecular weight (Mw) refers to a value that is given by an analysis made through gel permeation chromatography using tetrahydrofuran as a carrier, and is converted using a calibration curve based on standard polystyrene. In addition, the acid value of an alkali-soluble resin refers to the mg value (unit: mgKOH/g) of potassium hydroxide used to neutralize 1 g of an alkali-soluble resin.

Examples of alkali-soluble resins include cardo resins, acrylic resins, novolac resins, polyimide resins, polyimide precursors, polybenzoxazole resins, polybenzoxazole precursors, polyamide resins, siloxane resins, and the like. In cases where the black resin composition has negative photosensitivity, acrylic resins and polyimide resins are preferable from the viewpoints of patternability and coating film reliability, and acrylic resins are more preferable from the viewpoint of dispersion stability. On the other hand, in cases where the black resin composition has positive photosensitivity, polyimide resins, polyimide precursors, polybenzoxazole resins, polybenzoxazole precursors, and siloxane resins are preferable from the viewpoint of patternability, and polyimide resins and polyimide precursors are more preferable from the viewpoint of patternability.

A black pigment has absorption in almost all of the wavelength region of visible light, and hence, has a given degree of absorption in the adjacent near-infrared area in most cases. On the other hand, to enhance the chromaticity and the saturation, monochrome pigments such as red pigments, blue pigments, and yellow pigments desirably have smaller absorption in the visible light wavelength region corresponding to other colors, preferably have no absorption in such a wavelength region. As a pigment to be used in the present invention, such a monochrome pigment is preferably a pigment that has smaller absorption in the wavelength region corresponding to the near-infrared area, preferably has no absorption in the wavelength region corresponding to the near-infrared area. Specifically, it is preferable to use a pigment having a transmittance of 90% or more in the near-infrared area (in the wavelength range of from 800 to 1000 nm). Furthermore, making the particle diameter of the pigment smaller makes it possible to expect the enhancement of the transmittance of the near-infrared area, and hence, the pigment is preferably atomized to such an extent as makes it possible to achieve heat resistance and dispersion stability.

A black resin composition according to the present invention contains at least a red pigment and a blue pigment as (B) the colorant. Assuming that the total amount of (B) the colorant is 100 wt %, it is important that the amount of the red pigment is to 80 wt %, more preferably 45 to 65 wt %. In cases where a plurality of kinds of red pigments are used, the amount of the red pigment means the total amount of the red pigments. In addition, the amount of the blue pigment is preferably 20 to 50 wt %, more preferably 30 to 50 wt %, assuming that the total amount of (B) the colorant is 100 wt %. Mixing a red pigment and a blue pigment and using the resulting material as a colorant makes it possible to enhance light resistance and to achieve both a light-blocking ability in the visible wavelength region and a high penetrability in the near-infrared area. In cases where the amount of the red pigment is smaller than 20 wt %, the reflection chromaticity of the colored film shifts from an achromatic color to a reddish color, and an image reflected in the colored film is tinged with red. Hence, the amount is not preferable. On the other hand, in cases where the amount of the red pigment is larger than 80 wt %, the reflection chromaticity of the colored film shifts from an achromatic color to a yellowish color, and an image reflected in the colored film is tinged with yellow. Hence, the amount is not preferable, and also causes a problem in that the visible-light-blocking ability is decreased.

In the present invention, using, as (B) the colorant, a red pigment having low transmittance in the wavelength range (from 450 nm to 650 nm) having high luminous efficiency makes it possible to enhance the visible-light-blocking ability, and hence, is preferable. Specifically, the red pigment preferably has a ratio $T_{R1}/T_{R0}$ of 0.001 or more and 0.10 or less, and $T_{R1}/T_{R0}$ is more preferably 0.01 or more and 0.05 or less, wherein $T_{R1}$ is a transmittance at a wavelength of 555 nm, and TRO is an average transmittance in the wavelength region (from 450 nm to 650 nm). Selecting a pigment having a relatively low transmittance, that is, a high absorbance at 555 nm being regarded as the maximum spectral luminous efficiency makes it possible not only to achieve the visible-light-blocking ability effectively but also to obtain a coating film having a reflected color tone having higher jet-blackness, and hence is preferable. Here, the transmittance of (B) the colorant can be calculated by coating a transparent base material with a resin composition composed of (A) the resin, (B) the colorant, and (C) the organic solvent, curing the resin composition, and measuring the transmittance of the resulting colored film. In the present invention, the transmittance is a value obtained using a colored film formed so as to have a film thickness of 2 μm after being cured, in which the colored film is formed of a resin composition blended in such a manner that the amount of (B) the colorant is 25 wt % with respect to the total amount of the solid components composed of (A) the resin and (B) the colorant.

As a red pigment to be used in the present invention, any red pigment can be used without any particular limitation. Specific examples of red pigments include Pigment Red (hereinafter referred to as PR for short) 1, PR2, PR3, PR4, PR5, PR6, PR7, PR8, PR9, PR12, PR14, PR15, PR16, PR17, PR21, PR22, PR23, PR31, PR32, PR37, PR38, PR41, PR47, PR48, PR48:1, PR48:2, PR48:3, PR48:4, PR49, PR49:1, PR49:2, PR50:1, PR52:1, PR52:2, PR53, PR53:1, PR53:2, PR53:3, PR57, PR57:1, PR57:2, PR58:4, PR60, PR63, PR63:1, PR63:2, PR64, PR64:1, PR68, PR69, PR81, PR81:1, PR81:2, PR81:3, PR81:4, PR83, PR88, PR90:1, PR97, PR101, PR101:1, PR104, PR108, PR108:1, PR109, PR112, PR113, PR114, PR122, PR123, PR144, PR146, PR147, PR149, PR151, PR166, PR168, PR169, PR170, PR172, PR173, PR174, PR175, PR176, PR177, PR178, PR179, PR180, PR181, PR184, PR185, PR187, PR188, PR190, PR192, PR193, PR194, PR200, PR202, PR206, PR207, PR208, PR209, PR210, PR214, PR215, PR216, PR217, PR220, PR221, PR223, PR224, PR226, PR227, PR228, PR230, PR231, PR233, PR235, PR236, PR237, PR238, PR239, PR240, PR242, PR243, PR245, PR247, PR249, PR250, PR251, PR253, PR254, PR255, PR256, PR257, PR258, PR259, PR260, PR262, PR263, PR264, PR265, PR266, PR267, PR268, PR269, PR270, PR271, PR272, PR273, PR274, PR275, PR276, PR291, and the like. From the viewpoints of coloring power and the easiness of making the pigment finer, PR177, PR179, PR242, PR254, PR264, PR269, and PR291 are preferably used. From the viewpoint of decreasing the amount of a halogen, PR177, PR179, are PR264 are more preferable. From the viewpoint of making the reflected color tone of the colored film achromatic, PR179 and PR264 are still more preferable.

As a blue pigment to be used in the present invention, any blue pigment can be used without any particular limitation. Specific examples of blue pigments include Pigment Blue (hereinafter referred to as PB for short) 1, PB1:2, PB9, PB14, PB15, PB15:1, PB15:2, PB15:3, PB15:4, PB15:6, PB16, PB17, PB19, PB22, PB25, PB27, B28, PB29, PB33, PB35, PB36, PB56, PB56:1, PB60, PB61, PB61:1, PB62, PB63, PB64, PB67, PB68, PB71, PB72, PB73, PB74, PB75, PB76, PB77, PB78, PB79, and the like. From the viewpoints of coloring power and the easiness of making the pigment finer, PB15:3 and PB15:6 are preferably used.

To inhibit the scattered light of a colored film from coloring, it is important in the present invention to atomize the red pigment having a low transmittance, that is, a high absorbance in the wavelength range (from 400 nm to 700 nm) having high luminous efficiency.

The crystalline size of a pigment contained in the black resin composition and the colored film can be calculated according to the Scherrer equation represented by the following Equation (1) from the half bandwidth of the main peak having the highest intensity observed in an X-ray diffraction spectrum obtained using CuKα rays as an X-ray source.

[Math. 1]

$$\text{Crystalline size (nm)} = \frac{K\lambda}{\beta\cos\theta} \quad (1)$$

K in Equation (1) above is a constant of 0.9, and λ is 0.15418 [nm]. β is represented by the following Equation (2). θ represents a value that is ½ of the diffraction angle 2θ corresponding to the diffraction peak.

[Math. 2]

$$\beta = \sqrt{\beta_e^2 - \beta_o^2} \quad (2)$$

In Equation (2) above, $\beta_e$ is the half bandwidth of the diffraction peak, and $\beta_o$ is a corrected value (0.13[°]) of the half bandwidth. However, β, $\beta_e$, and $\beta_o$ are calculated in radians.

For example, the main peak having the highest intensity is observed at a diffraction angle 2θ of 28.0° or more and 28.6° or less in the case of red pigment PR254, at a diffraction angle 2θ of 11.9° or more and 12.5° or less in the case of red pigment PR177, at a diffraction angle 2θ of 8.9° or more and 9.5° or less in the case of blue pigment PB15:6, at a diffraction angle 2θ of 25.7° or more and 26.3° or less in the case of yellow pigment 138, and at a diffraction angle 2θ of 8.3° or more and 8.9° or less in the case of yellow pigment 150.

The X-ray diffraction spectrum is measured by a wide-angle X-ray diffraction method performed using CuKα rays as an X-ray source. An X-ray diffractometer that can be used is a DS ADVANCE manufactured by Bruker AXS GmbH. The measurement conditions are based on an output of 40 kV/40 mA, a slit system with Div. Slit at 0.3°, a measurement step (2θ) of 0.0171°, and a measurement time of 0.5 seconds/step.

For a colored film composed of a cured product of the black resin composition according to the present invention, it is important that the crystalline size of the red pigment is 5 nm or more and 25 nm or less as determined from the half bandwidth of the main peak of an X-ray diffraction spectrum obtained using CuKα rays as an X-ray source. The crystalline size is more preferably 5 nm or more and 20 nm or less. Such a crystalline size is an index for the dispersion state of the pigment in the colored film. A smaller crystalline size means that the pigment is better microdispersed in the colored film. In this regard, two or more kinds of red pigments can be used. In cases where two or more kinds of red pigments are used, the crystalline size of the red pigment the amount of which is larger is 5 nm or more and 25 nm or less. In addition, it is desirable that the crystalline size of each kind of red pigment is 5 nm or more and 25 nm or less. Here, a colored film in the present invention is a film composed of a cured product of a black resin composition according to the present invention. It is preferable that the cross-linkable group contained in (A) the resin in the black resin composition is cross-linked by heat and/or light, and is substantially not remaining. Such a colored film can be given by forming a coating film of the black resin composition on a transparent base material, drying the coating film using a hot plate or the like, and then heating the coating film using a hot air oven or the like. For example, in cases where the black resin composition contains an acrylic resin as (A) the resin, the heating temperature is preferably 170° C. or more, and the heating time is preferably 30 minutes or more. In cases where the crystalline size of the red pigment in the colored film is larger than 25 nm, the near-infrared penetrability is decreased, the transmitted scattered light is increased, and thus, the clarity of the infrared-ray camera image given via the colored film is decreased. In addition, the reflected scattered light of the colored film is increased, and thus, the reflection chromaticity becomes yellowish, resulting in degrading the design. To obtain a clearer infrared-ray camera image, the crystalline size of the red pigment is more preferably 20 nm or less. On the other hand, in cases where the crystalline size of the red pigment in the colored film is less than 5 nm, the pigment is difficult to disperse and stabilize, causing a problem in that the transmitted scattered light is increased by the reaggregation of the pigment, and that the visible-light-blocking ability is decreased. The crystalline size of each of the blue pigment and another colorant in the colored film is preferably small as with the red pigment, and in the range of from 5 nm or more and 25 nm or less. A means of bringing the crystalline size of the pigment in the colored film within the above-mentioned range preferably involves dispersing the pigment stably and uniformly in minute form in the resin without reaggregating the pigment. More specific examples include: a method of producing the black resin composition using a process in which a pigment having a smaller crystalline size is used or a process in which the below-mentioned bead mill is used; and the like. In this regard, in cases where a black resin composition according to the present invention contains no polymerizable or cross-linkable component, the "colored film composed of a cured product" refers to the coating film of the black resin composition, wherein the film has been, for example, heated in such a manner that (C) the organic solvent is distilled away.

Containing, as (B) the colorant, a red pigment, a blue pigment, and another colorant together makes it possible to adjust the transmitted color tone and reflected color tone of the colored film. In this case, it is preferable to contain a colorant having a small crystalline size, as with the red pigment. Examples of colorants include organic pigments, inorganic pigments, and dyes that are commonly used. To enhance the heat resistance, reliability, and light resistance of the colored film, organic pigments and inorganic pigments are preferable.

As a yellow pigment to be used in the present invention, any yellow pigment can be used without any particular limitation. Examples of yellow pigments include Pigment Yellow (hereinafter referred to as PY for short) 1, PY1:1, PY1:2, PY2, PY3, PY4, PY5, PY6, PY9, PY10, PY12, PY13, PY14, PY16, PY17, PY20, PY24, PY31, PY32, PY34, PY35, PY35:1, PY36, PY36:1, PY37, PY37:1, PY40, PY41, PY42, PY43, PY48, PY53, PY55, PY61, PY62, PY62:1, PY63, PY65, PY73, PY74, PY75, PY81, PY83, PY86, PY87, PY93, PY94, PY95, PY97, PY100, PY101, PY104, PY105, PY108, PY109, PY110, PY111, PY116, PY117, PY119, PY120, PY125, PY126, PY127, PY127:1, PY128, PY129, PY133, PY134, PY136, PY137, PY138, PY139, PY142, PY147, PY148, PY150, PY151, PY153, PY154, PY155, PY157, PY158, PY159, PY160, PY161, PY162, PY163, PY164, PY165, PY166, PY167, PY168, PY169, PY170, PY172, PY173, PY174, PY175, PY176, PY180, PY181, PY182, PY183, PY184, PY185, PY188, PY189, PY190, PY191, PY191:1, PY192, PY193, PY194, PY195, PY196, PY197, PY198, PY199, PY200, PY202, PY203, PY204, PY205, PY206, PY207, PY208, and the like. From the viewpoints of coloring power, heat resistance, and light resistance, PY129, PY138, PY139, PY150, a PY185 are preferably used. From the viewpoint of decreasing the amount of a halogen contained in the black resin composition, PY129, PY139, PY150, and PY185 are more preferable. From the viewpoint of achieving a better visible-light-blocking ability, at least one yellow pigment selected from the group consisting of PY139, PY150, and PY185 is more preferable.

Examples of orange pigments include Pigment Orange (hereinafter referred to as PO for short) 13, PO36, PO38, PO43, PO51, PO55, PO59, PO61, PO64, PO65, PO71, and the like.

In addition, examples of violet pigments to be used include Pigment Violet (hereinafter referred to as PV for short) 14, PV15, PV16, PV19, PV23, PV25, PV27, PV29, PV30, PV31, PV32, PV37, PV39, PV40, PV42, PV47, PV49, PV50, and the like.

In addition, examples of green pigments to be used include Pigment Green (hereinafter referred to as PG for short) 1, PG2, PG4, PG7, PG8, PG10, PG13, PG14, PG15, PG18, PG19, PG26, PG36, PG45, PG48, PG50, PG51, PG54, PG55, PG58, PG59, and the like.

Examples of black pigments include: black organic pigments of carbon black, perylene black, aniline black, or the like; metal fine particles of graphite, titanium, copper, iron, manganese, cobalt, chromium, nickel, zinc, calcium, silver, or the like; and inorganic pigments of metal oxide, composite oxide, metal sulfide, metal nitride, metal oxynitride, or the like. In cases where such a black pigment is used, the amount thereof is desirably small so as not to decrease in the transmittance in the near-infrared area. Using a black pigment in a small amount is effective for decreasing the transmittance in the visible wavelength region.

In addition, examples of white pigments include titanium dioxide, barium carbonate, zirconium oxide, calcium carbonate, barium sulfate, alumina white, silicon dioxide, and the like.

Examples of dyes include: C.I. Direct Red 2, 4, 9, 23, 26, 28, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C.I. Acid Red 35, 42, 51, 52, 57, 62, 80, 82, 111, 114, 118, 119, 127, 128, 131, 143, 145, 151, 154, 157, 158, 211, 249, 254, 257, 261, 263, 266, 289, 299, 301, 305, 319, 336, 337, 361, 396, and 397; C.I. Reactive Red 3, 13, 17, 19, 21, 22, 23, 24, 29, 35, 37, 40, 41, 43, 45, 49, and 55; C.I. Basic Red 12, 13, 14, 15, 18, 22, 23, 24, 25, 27, 29, 35, 36, 38, 39, 45, and 46; C.I. Direct Violet 7, 9, 47, 48, 51, 66, 90, 93, 94, 95, 98, 100, and 101; C.I. Acid Violet 5, 9, 11, 34, 43, 47, 48, 51, 75, 90, 103, and 126; C.I. Reactive Violet 1, 3, 4, 5, 6, 7, 8, 9, 16, 17, 22, 23, 24, 26, 27, 33, and 34; C.I. Basic Violet 1, 2, 3, 7, 10, 15, 16, 20, 21, 25, 27, 28, 35, 37, 39, 40, and 48; C.I. Direct Yellow 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C.I. Reactive Yellow 2, 3, 13, 14, 15, 17, 18, 23, 24, 25, 26, 27, 29, 35, 37, 41, and 42; C.I. Basic Yellow 1, 2, 4, 11, 13, 14, 15, 19, 21, 23, 24, 25, 28, 29, 32, 36, 39, and 40; C.I. Acid Green 16; C.I. Acid Blue 9, 45, 80, 83, 90, and 185; C.I. Basic Orange 21 and 23; and the like.

It is possible to contain two or more of these colorants other than a red pigment and a blue pigment.

Among these colorants other than a red pigment and a blue pigment, a yellow pigment is preferably further used in addition to a red pigment and a blue pigment from the viewpoints of further enhancing the visible-light-blocking ability of the colored film and furthermore making the reflection chromaticity of the coating film achromatic. The amount of a yellow pigment is preferably 5 wt % or more and 30 wt % or less, more preferably 5 wt % or more or 25 wt % or less, still more preferably 10 wt % or more and 20 wt % or less, with respect to 100 wt % of the total amount of the colorants.

The amount of (B) the colorant contained in a black resin composition according to the present invention is preferably 1 to 60 wt % with respect to the total amount of the solid components contained in the composition. Here, the solid components refer to (A) the resin, (B) the colorant, and the below-mentioned (D) photosensitizer, (E) radical polymerizable compound, and other additives. Bringing the amount of (B) the colorant to 1 wt % or more with respect to the total amount of the solid components contained in the composition makes it possible to enhance the visible-light-blocking ability of the film that may be thinner. The amount of (B) the colorant is more preferably 10 wt % or more, still more preferably 15 wt % or more, with respect to the total amount of the solid components contained in the composition. On the other hand, bringing the amount of (B) the colorant to 60 wt % or less with respect to the total amount of the solid components contained in the composition makes it possible to enhance the dispersion stability of (B) the colorant. In addition, such an amount makes it possible to inhibit the reflection of incident light at the interface between the colored film and another base material, and to further enhance the near-infrared penetrability. From the viewpoint of adjusting the reflection chromaticity of the colored film to a more achromatic color, the amount of (B) the colorant is more preferably 35 wt % or less with respect to the total amount of the solid components contained in the composition.

Examples of (C) the organic solvent include ethers, acetates, esters, ketones, aromatic hydrocarbons, amides, alcohols, and the like.

Examples of ethers include ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, dipropylene glycol dimethyl ether, dipropylene glycol methyl-n-butyl ether, tripropylene glycol monomethyl ether, tripropylene glycol monoethyl ether, diethylene glycol dimethyl ether, diethylene glycol methyl ethyl ether, diethylene glycol diethyl ether, tetrahydrofuran, and the like. Examples of acetates include butyl acetate, ethylene glycol monomethyl ether acetate, ethylene glycol monoethyl ether acetate, propylene glycol monomethyl ether acetate, 3-methoxybutyl acetate, ethylene glycol monobutyl ether acetate, diethylene glycol monomethyl ether acetate, diethylene glycol monoethyl ether acetate, diethylene glycol monobutyl ether acetate, cyclohexanol acetate, propylene glycol diacetate, propylene glycol monomethyl ether acetate, propylene glycol monoethyl ether acetate (hereinafter referred to as "PGMEA"), dipropylene glycol methyl ether acetate, 3-methoxy-3-methyl-1-butyl acetate, 1,4-butanediol diacetate, 1,3-butylene glycol diacetate, 1,6-hexanediol diacetate, and the like. Examples of esters include: alkyl lactate esters such as methyl 2-hydroxypropionate and ethyl 2-hydroxypropionate; ethyl 2-hydroxy-2-methylpropionate; methyl 3-methoxypropionate; ethyl 3-methoxypropionate; methyl 3-ethoxypropionate; ethyl 3-ethoxypropionate; ethyl ethoxyacetate; ethyl hydroxyacetate; methyl 2-hydroxy-3-methylbutanoate; 3-methoxybutyl acetate; 3-methyl-3-methoxybutyl acetate; 3-methyl-3-methoxybutyl propionate; ethyl acetate; n-propyl acetate; i-propyl acetate; n-butyl acetate; i-butyl acetate; n-pentyl formate; i-pentyl acetate; n-butyl propionate; ethyl butyrate; n-propyl butyrate; i-propyl butyrate; n-butyl butyrate; methyl pyruvate; ethyl pyruvate; n-propyl pyruvate; methyl acetoacetate; ethyl acetoacetate; ethyl 2-oxobutanoate; and the like. Examples of ketones include methylethyl ketone, cyclohexanone, 2-heptanone, 3-heptanone, and the like. Examples of aromatic hydrocarbons include toluene, xylene, and the like. Examples of amides include N-methyl pyrrolidone, N,N-dimethyl formamide, N,N-dimethyl acetoamide, and the like. Examples of alcohols include butyl alcohol, isobutyl alcohol, pentanol, 4-methyl-2-pentanol, 3-methyl-2-butanol, 3-methyl-3-methoxy butanol, diacetone alcohol, and the like. It is possible to contain two or more of these.

Among these, acetates are preferably used to disperse and stabilize the colorant better. The amount of an acetate in (C) the organic solvent is preferably 40 to 100 wt %, more preferably 70 to 100 wt %.

The amount of (C) the organic solvent in a black resin composition according to the present invention is preferably 50 wt % or more, more preferably 70 wt % or more, from the viewpoint of the film thickness uniformity of the coating film in a coating step. On the other hand, the amount of (C) the organic solvent is preferably 95 wt % or less, more preferably 90 wt % or less, from the viewpoint of inhibiting pigment sedimentation.

Containing an alkali-soluble resin as (A) the resin and furthermore (D) the photosensitizer makes it possible for a black resin composition according to the present invention to have photosensitivity. The photosensitivity may be what is called a negative type, which means that the alkali-solubility of the exposed portion is decreased by patterned exposure via an exposure mask, whereafter the unexposed portion is removed with an alkaline developer, resulting in forming a pattern. The photosensitivity may be what is called a positive type, which means that the alkali-solubility of the exposed portion is made higher than the alkali-solubility of the unexposed portion by patterned exposure via an exposure mask, whereafter the exposed portion is removed with an alkaline developer, resulting in forming a pattern. In the present invention, the photosensitivity is preferably of a negative type because this type makes it easier to form a pattern having a higher resolution even in cases where the light-blocking ability is high.

Containing a photoinitiator as (D) the photosensitizer and furthermore (E) the radical polymerizable compound makes it possible to have a negative type of photosensitivity, which means that the exposed portion is photocured by radical polymerization reaction. (E) the radical polymerizable compound is preferably a compound having two or more radical polymerizable groups.

A photoinitiator refers to a compound that undergoes bond cleavage and/or reaction under exposure, resulting in generating radicals. Containing a photoinitiator makes it possible that exposure photocures (E) the radical polymerizable compound.

Examples of photoinitiators include carbazole photoinitiators, acylphosphine oxide photoinitiators, oxime ester photoinitiators, α-aminoalkylphenon photoinitiators, and the like. It is possible to contain two or more of these. Among these, carbazole photoinitiators and oxime ester photoinitiators are preferable in the below-mentioned exposure step because these have high sensitivity to a line mixture composed of the i-line (365 nm), the h-line (405 nm), and the g-line (436 nm).

From the viewpoint of enhancing the sensitivity to exposure, the amount of the photoinitiator is preferably 1 wt % or more with respect to the total amount of the alkali-soluble resin and (E) the radical polymerizable compound.

On the other hand, from the viewpoint of deep-portion curability to exposure, the amount of the photoinitiator is preferably 60 wt % or less, more preferably 40 wt % or less, with respect to 100 wt % of the total amount of the alkali-soluble resin and (E) the radical polymerizable compound.

A radical polymerizable group possessed by (E) the radical polymerizable compound is preferably a (meth)acryl group from the viewpoints of enhancing the sensitivity during exposure and enhancing the hardness of the colored film. Here, a (meth)acryl group refers to a methacryl group or an acryl group.

From the viewpoint of enhancing the sensitivity to exposure, the amount of the (E) the radical polymerizable compound is preferably 5 wt % or more, more preferably 15 wt % or more, with respect to the total amount of the above-mentioned alkali-soluble resin and (E) the radical polymerizable compound. On the other hand, from the viewpoint of the reflow performance in the curing step, the amount of the (E) the radical polymerizable compound is preferably 80 wt % or less, more preferably 60 wt % or less, with respect to the total amount of the alkali-soluble resin and (E) the radical polymerizable compound.

Containing a photo-acid generator as (D) the photosensitizer makes it possible to enhance the alkali-solubility of the exposed portion relatively to have a positive type of photosensitivity.

A preferable photo-acid generator is a quinone diazide compound. A more preferable quinone diazide compound is an esterified product between a compound having a phenolic hydroxyl group and quinone diazide sulfonyl acid chloride. To enhance the alkali-solubility, part of the phenolic hydroxyl groups may be allowed to remain on purpose without being esterified.

The amount of the quinone diazide compound is preferably 1 to 50 wt % with respect to the total amount of the above-mentioned alkali-soluble resin from the viewpoint of patternability.

It is preferable that a black resin composition according to the present invention further contains a polymer dispersant.

A polymer dispersant refers to an agent having both a pigment-philic group having an effect of chemical bonding or adsorption to the surface of a pigment and a solvent-philic polymer chain or group. In the below-mentioned wet type media dispersion treatment, a polymer dispersant has the effect of enhancing the wettability of a pigment in dispersion media to facilitate the deagglomeration of the pigment, the effect of exerting a steric hindrance and/or electrostatic repulsion action to stabilize the particle size and viscosity, and furthermore, the effect of inhibiting the generation of the color separation during the storage or application of the black resin composition.

Examples of polymer dispersants include polyester polymer dispersants, acryl polymer dispersants, polyurethane polymer dispersants, polyallylamine polymer dispersants, carbodiimide dispersants, polyamide polymer dispersants, and the like. Among these, acryl polymer dispersants and polyamide polymer dispersants are more preferable. The polyamide polymer dispersant preferably has a comb-like structure containing a plurality of side chains each composed of a polyester chain. More specifically, the dispersant is preferably a compound that has, as the main chain, a structure containing many nitrogen atoms, such as polyalkyleneimine, and has a plurality of side chains each composed of a polyester chain and amide-bonded via the nitrogen atoms. Examples of such a polyamide dispersant having a comb-like structure include "DISPERBYK" 2200 (manufactured by BYK-Chemie GmbH), "SOLSPERSE" 11200 and 28000 (which are all manufactured by Lubrizol Corporation), and the like.

Polymer dispersants are classified into dispersants having an amine value of 1 mgKOH/g or more and an acid value of less than 1 mgKOH/g, dispersants having an acid value of 1 mgKOH/g or more and an amine value of less than 1 mgKOH/g, dispersants having an amine value of 1 mgKOH/g or more and an acid value of 1 mgKOH/g or more, and dispersants having an amine value of less than 1 mgKOH/g and an acid value of less than 1 mgKOH/g. It is possible to contain two or more of these. Among these, dispersants having an amine value of 1 mgKOH/g or more are preferable.

Examples of polymer dispersants having an amine value of 1 mgKOH/g or more and an acid value of less than 1 mgKOH/g include: "DISPERBYK" 102, 160, 161, 162, 2163, 164, 2164, 166, 167, 168, 2000, 2050, 2150, 2155, 9075, and 9077, "BYK"-LP N6919, "DISPERBYK"-LP N21116, and "DISPERBYK"-LP N21234 (which are all manufactured by BYK-Chemie GmbH); "EFKA" 4015, 4020, 4046, 4047, 4050, 4055, 4060, 4080, 4300, 4330, 4340, 4400, 4401, 4402, 4403, and 4800 (which are all manufactured by BASF SE); "AJISPER" PB711 (manufactured by Ajinomoto Fine-Techno Co., Inc.); "SOLSPERSE" 13240, 13940, 20000, 71000, and 76500 (which are all manufactured by Lubrizol Corporation); and the like.

Examples of polymer dispersants having an amine value of 1 mgKOH/g or more and an acid value of 1 mgKOH/g or more include: "DISPERBYK" 142, 145, 2001, 2010, 2020, 2025, and 9076, and Anti-Terra-205 (which are all manufactured by BYK-Chemie GmbH); "SOLSPERSE" 24000 (manufactured by Lubrizol Corporation); "AJISPER" PB821, PB880, and PB881 (which are all manufactured by Ajinomoto Fine-Techno Co., Inc.); "SOLSPERSE" 9000, 11200, 13650, 24000SC, 24000GR, 32000, 32500, 32550, 326000, 33000, 34750, 35100, 35200, 37500, 39000, and 56000 (manufactured by Lubrizol Corporation); and the like.

The amount of the polymer dispersant in a black resin composition according to the present invention is preferably 10 wt % or more, more preferably 20 wt % or more, with respect to the total amount of (B) the colorant from the viewpoint of stabilizing the dispersion stability. On the other hand, the amount of the polymer dispersant is preferably 100 wt % or less, more preferably 60 wt % or less, with respect to the total amount of (B) the colorant from the viewpoint of enhancing the heat resistance and adhesiveness of the colored film.

A black resin composition according to the present invention may contain a thermal cross-linking agent. Containing a thermal cross-linking agent makes it possible to enhance the strength of the finally resulting coating film. Examples of thermal cross-linking agents include melamine cross-linking agents, oxazoline cross-linking agents, carbodiimide cross-linking agents, isocyanate cross-linking agents, aziridine cross-linking agents, epoxy cross-linking agents, and the like. It is possible to contain two or more of these.

A black resin composition according to the present invention may contain a leveling agent. Containing a leveling agent makes it possible to enhance the applicability and the surface smoothness of the colored film. Examples of leveling agents include: anion surfactants such as ammonium laurylsulfate and triethanolamine polyoxyethylenealkyl ether sulfate; cation surfactants such as stearylamine acetate and lauryltrimethyl ammonium chloride; amphoteric surfactants such as lauryldimethyl amine oxide and laurylcarboxymethylhydroxyethyl imidazolium betaine; nonionic surfactants such as polyoxyethylenelauryl ether, polyoxyethylenestearyl ether, and sorbitan monostearate; silicone surfactants having polydimethyl siloxane or the like as the main skeleton; fluorine surfactants; and the like. It is possible to contain two or more of these. Examples of commercially available surfactants include "BYK"-302, "BYK"-333, "BYK"-3550, and "BYK"-392 (which are all manufactured by BYK-Chemie GmbH).

A colored film formed of a black resin composition according to the present invention so as to have optical density (OD value) of 4 preferably has an average light transmittance of 94% or more, more preferably 96% or more, with respect to near-infrared rays in the wavelength range of from 920 nm to 960 nm. Having an average light transmittance of 94% or more in the wavelength range of from 920 nm to 960 nm makes it possible to further enhance the infrared-ray intensity given via the colored film, and to further enhance the sensitivity of a near-infrared sensor and the illuminance of a near-infrared camera image. In addition, an average light transmittance of 96% or more makes the effect more marked.

The light transmittance of the colored film can be measured as follows: a coating film of the black resin composition is formed on a transparent base material; the coating film is dried using a hot plate or the like; then, the coating film is heated using a hot air oven or the like to give a colored film; and the light transmittance of the colored film is measured with an ultraviolet-visible-near-infrared spectrophotometer using the light transmittance of the transparent base material as a reference. As above-mentioned, it is preferable for the colored film that the cross-linkable group contained in (A) the resin in the black resin composition is cross-linked by heat and/or light, and is substantially not remaining. For example, in cases where the black resin composition contains an acrylic resin as (A) the resin, the heating temperature is preferably 170° C. or more, and the heating time is preferably 30 minutes or more. A preferable ultraviolet-visible spectrophotometer is a UV-3150 (manufactured by Shimadzu Corporation), and a preferable transparent base material is a translucent glass base material TEMPAX (manufactured by AGC Techno Glass Co., Ltd.). In this regard, the OD value of each of the coating film and the colored film can be determined as follows: the intensity of each of the incident light and transmitted light of the coating film or the colored film is measured using an optical densitometer (361TVisual manufactured by X-Rite, Inc.); and the OD value is calculated in accordance with the following Equation (3).

$$OD \text{ value} = \log_{10}(I_0/I) \quad \text{Equation (3)}$$

$I_0$: Intensity of incident light
I: Intensity of transmitted light

Optical density (OD value) of a colored film given by curing a black resin composition according to the present invention is preferably 0.5 or more, more preferably 0.7 or more, in terms of the OD value per 1 μm in film thickness. The higher the OD value per unit film thickness is, that is, the lower the transmittance in the visible wavelength region is, the thinner the film thickness of the colored film that can achieve a desired visible-light-blocking ability can be made.

In addition, a colored film formed of a black resin composition according to the present invention so as to have optical density (OD value) of 2 preferably has a haze value of 2% or less, preferably 1% or less, more preferably 0.5%, in the near-infrared area. A haze value is an index of the scattering intensity of near-infrared transmitted light. Having a haze value of 2% or less makes it possible to further inhibit the scattering intensity of near-infrared transmitted light given via a colored film, and to further enhance the resolution of a near-infrared camera image. That is, a cured film produced using a black resin composition according to the present invention can be used suitably as a near-infrared-transmitting light-blocking film.

Figure 2:
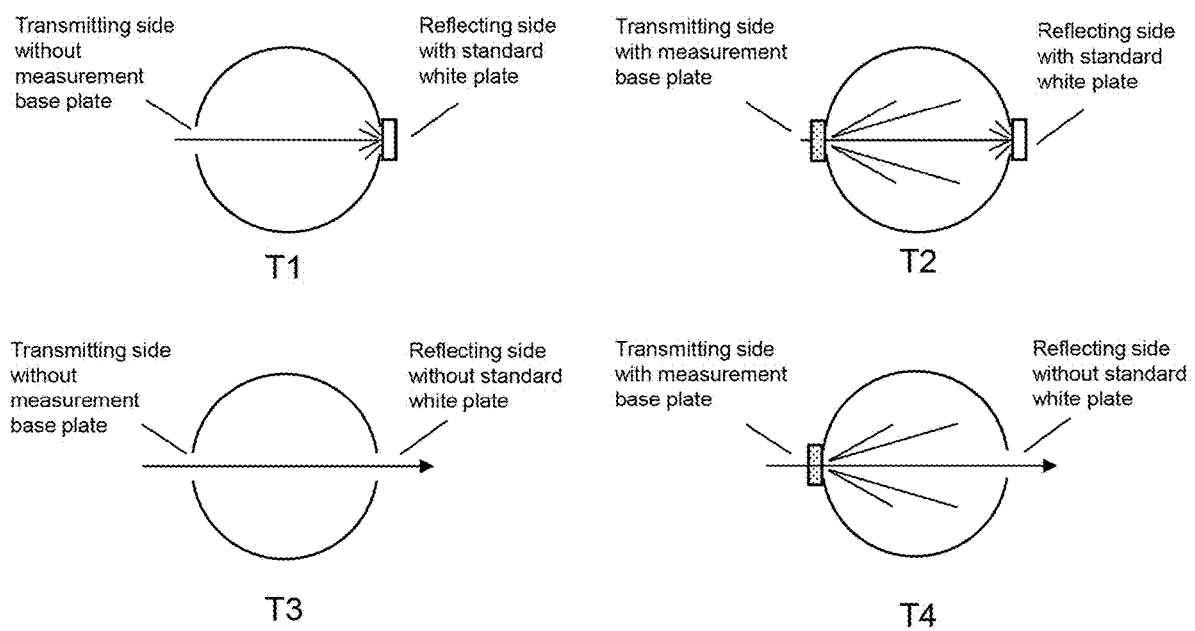
FIG. 2 is a schematic diagram for explaining a measurement system to be used to determine the haze of a colored film.

For a colored film produced on a transparent base material (denoted as a "measurement base plate" in FIG. 2) by the same operation as in the measurement of the light transmittance, the haze of the colored film is calculated in accordance with the following Equation (4) on the basis of the amount of light (the sum of [the total amount of light detected using the integrating sphere]/[the amount of light incident into the integrating sphere from the transmitting side of the integrating sphere], as obtained by scanning in a wavelength range) measured using an ultraviolet-visible-near-infrared spectrophotometer and an integrating sphere, wherein the light is captured by the integrating sphere configured as depicted in FIG. 2.

$$\text{Haze (\%)} = [(T4/T2) - (T3/T1)] \times 100 \quad \text{Equation (4)}$$

T1: the amount of light captured by the integrating sphere the transmitting side of which is open and to the reflecting side of which a standard white plate is attached T2: the amount of light captured by the integrating sphere to the transmitting side of which a measurement base plate is attached and to the reflecting side of which a standard white plate is attached T3: the amount of light captured by the integrating sphere both the transmitting side and reflecting side of which are open T4: the amount of light captured by the integrating sphere to the transmitting side of which a measurement base plate is attached and the reflecting side of which is open A colored film formed of a black resin composition according to the present invention so as to have a film thickness of 1.0 μm on a non-alkali glass having a thickness of 0.7 mm preferably has a reflection chromaticity value (a*, b*) of $-0.5 \leq a^* \leq 1.0$ and $-1.0 \leq b^* \leq 0.5$, preferably $-0.5 \leq a^* \leq 0.5$ and $-1.0 \leq b^* \leq 0.4$, on the basis of the CIE1976 (L*, a*, b*) color system, as the value is measured on the glass side of the colored film using the SCI method. A reflection chromaticity is an index of the color tone of an image reflected on a colored film, and a reflection chromaticity closer to (a*, b*)=(0.0, 0.0) can be said to represent an achromatic reflected color tone. On the other hand, the reflected color tone of the black display on a liquid crystal display device or an organic EL display commonly has a negative value as b*, and is a bluish color tone. Accordingly, a decorative film to be used for a display device preferably has a negative value as b*.

A colored film formed of a black resin composition according to the present invention so as to have a film thickness of 1.0 μm on a non-alkali glass having a thickness of 0.7 mm preferably has a brightness value L* of $0.01 \leq L^* \leq 1.0$, more preferably $0.01 \leq L^* \leq 0.8$, on the basis of the CIE1976 (L*, a*, b*) color system, as the value is measured on the glass side of the colored film using the SCE method. To increase the degree of jet-black of a light-blocking film, it is important to decrease the diffused reflection on a colored film, and the SCE/L* value as the brightness of diffused reflection is preferably closer to 0. On the other hand, the reflected color tone of the black display on a liquid crystal display device or an organic EL display commonly has a negative value as b*, and is a bluish color tone. Accordingly, a decorative film to be used for a display device preferably has a negative value as b*.

A colorimetric value (color value) measured with a colorimeter is significantly influenced by the geometric conditions of lighting and light-receiving. The geometric conditions for a colorimeter are generally classified into a 45-degree lighting system and a diffused lighting system that involves using an integrating sphere. The diffused lighting is further classified into SCI (Specular Component Include) and SCE (Specular Component Exclude) in accordance with a difference in a method of processing a regular reflection component with a light trap. In SCI, all the regular reflection components due to a sample are integrated. On the other hand, SCE involves causing regular reflection components to be removed by a light trap provided on the wall face of an integrating sphere, thus resulting in measuring diffused reflection components.

The reflection chromaticity (L*,a*,b*) of a colored film is determined by measuring the total reflection chromaticity (SCI) and diffused reflection chromaticity (SCE) to light incident from a transparent base material under measurement conditions based on a standard light source D65 (having a color temperature of 6504K), a viewing angle of 2° (CIE1976), atmospheric pressure, and 20° C., using a spectrocolorimeter (CM-2600d manufactured by Konica Minolta, Inc.) calibrated with a white color calibration plate (CM-A145 manufactured by Konica Minolta, Inc.).

A preferable method of producing a black resin composition according to the present invention is, for example, a method in which a resin solution containing (A) the resin, (B) the colorant, and (C) the organic solvent is dispersed using a disperser to preliminarily prepare a colorant dispersion liquid having a high colorant concentration, then (A) the resin and another component such as photosensitizer are further added, if desired, and the resulting mixture is stirred. If desired, filtration may be performed.

In the present invention, a pigment atomized preliminarily is preferably used as (B) the colorant. Examples of means of atomizing a pigment include: salt milling in which a pigment, an inorganic salt, and an organic solvent are kneaded and milled; acid slurry treatment in which a pigment is once dissolved in strong acid such as sulfuric acid, and mixed with a poor solvent; and the like.

A preferable salt milling treatment is a method in which a pigment, a water-soluble inorganic salt, and an organic solvent that does not dissolve the inorganic salt are kneaded, the material kneaded is then introduced into water, and the resulting slurry is filtrated and washed with water to remove the inorganic salt. Together with the pigment, the water-soluble inorganic salt, and the organic solvent, a resin such as a polymer dispersant and a pigment derivative may be added to inhibit the reaggregation of the pigment atomized by salt milling.

Examples of water-soluble inorganic salts include sodium chloride, potassium chloride, calcium chloride, barium chloride, sodium sulfate, and the like.

The organic solvent is subject to no particular limitation as long as the organic solvent is water-soluble and does not dissolve a water-soluble inorganic salt. The organic solvent rises in temperature during salt milling to become easier to evaporate, and hence, is preferably a high-boiling solvent from a safety viewpoint. Examples include 2-methoxy ethanol, 2-butoxy ethanol, 2-(isopentyloxy) ethanol, 2-(hexyloxy) ethanol, diethylene glycol, diethylene glycol monomethyl ether, diethylene glycol monoethyl glycol, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low-molecular-weight polypropylene glycol, and the like. It is possible to use two or more of these.

Examples of kneading devices include: kneaders; mix mullers; a "TRIMIX" that is a planetary mixer manufactured by Inoue Mfg., Inc.; a "MIRACLE KCK" that is a continuous single-screw kneader manufactured by Asada Iron Works Co., Ltd.; and the like.

Examples of dispersers for dispersing a resin solution containing (A) the resin, (B) the colorant, and (C) the organic solvent include ball mills, bead mills, sand grinders, triple-roll mills, high-speed impact mills, and the like. Among these, bead mills are preferable for the sake of higher dispersion efficiency and microdispersion. Examples of bead mills include co-ball mills, basket mills, pin mills, DYNO-MILL, and the like. Examples of beads for bead mills include titania beads, zirconia beads, and zircon beads.

In the present invention, the dispersion is preferably performed in multiple stages using a bead mill. It is preferable to have a step in which performing a dispersion treatment using a bead mill with beads having an average bead diameter of more than 0.1 mm is followed by performing a dispersion treatment using a bead mill with beads having an average bead diameter of 0.1 mm or less. Performing a dispersion treatment using a bead mill with beads having an average bead diameter of more than 0.1 mm makes it possible to efficiently disintegrate a bisbenzofuranone pigment having a large crystalline size. Then performing a dispersion treatment using a bead mill with minute beads having an average bead diameter of 0.1 mm or less makes it possible that the energy to be given to the pigment is decreased, thus allowing the surface activity of the pigment to be inhibited while the microdispersion is performed, and that the pigment in the black resin composition is inhibited from being reaggregated, and is dispersed more uniformly. In this case, the bead mill preferably includes a separator that is based on a centrifugation method that enables minute beads and a dispersion liquid to be separated. Here, the average bead diameter refers to a number-average value of the equivalent circle diameters of beads. Specifically, the bead diameter can be determined as follows: beads are photographed under a stereoscopic microscope at a magnification of 45×; 100 beads selected randomly are used to measure the longest diameter and shortest diameter of each bead; the average value of both diameters is defined as an equivalent circle diameter; and the number-average value of the equivalent circle diameters is calculated.

A black resin composition according to the present invention is applied to a transparent base material such as a glass, plastic, or film material, and cured, whereby a colored film can be obtained. The coating method is subject to no particular limitation, and is, for example, silk-screen printing, off-set printing, pad printing, letterpress printing, gravure printing, inkjet printing, gravure coating, roll coating, reverse roll coating, roll doctor coating, bar coating, curtain flow coating, die coating, spin coating, air doctor coating, spray coating, or the like depending on the base material and the liquid characteristics of the black resin composition.

Next, a method of curing a black resin composition according to the present invention to form a colored film will be described with reference to a black resin composition having a negative type of photosensitivity.

A photosensitive black resin composition is applied to a base plate to obtain a coating film. Examples of base plates include: transparent base plates made of soda glass, non-alkali glass, quartz glass, or the like; base plates made of a silicon wafer, ceramic, or gallium arsenide; and the like. Examples of coating methods include: spin-coating performed using a spinner; spray coating: inkjet coating; die coating; roll coating; and the like. The film thickness of the coating film can be selected suitably depending on the coating method or the like. The thickness of the film that has been dried is commonly 1 to 150 μm.

The resulting coating film is dried to obtain a dried film. Examples of drying methods include heat-drying, air-drying, vacuum-drying, infrared radiation, and the like. Examples of heat-drying devices include ovens, hot plates, and the like. The drying temperature is preferably 50 to 150° C., and the drying time is preferably 1 minute to several hours.

The resulting dried film is irradiated with actinic rays via a mask having a desired pattern, whereby an exposed film is obtained. Examples of actinic rays for irradiation include ultraviolet rays, visible rays, electron rays, X rays, and the like. A black resin composition according to the present invention is preferably irradiated with the i-line (365 nm), h-line (405 nm), or g-line (436 nm) of a mercury-vapor lamp.

The resulting exposed film is developed using an alkaline developer or the like, whereby the unexposed portion is removed to give a pattern. Examples of an alkaline compound to be used as an alkaline developer include inorganic alkalis and organic alkalis. Examples of inorganic alkalis include sodium hydroxide, potassium hydroxide, sodium carbonate, potassium carbonate, sodium silicate, sodium metasilicate, ammonia water, and the like. Examples of organic alkalis include the following: primary amines such as ethylamine and n-propylamine; secondary amines such as diethylamine and di-n-propylamine; tertiary amines such as triethylamine and methyldiethylamine; tetraalkylammonium hydroxides such as tetramethyl ammonium hydroxide (TMAH); quaternary ammonium salts such as choline; alcohol amines such as triethanolamine, diethanolamine, monoethanolamine, dimethylamino ethanol, and diethylamino ethanol; and cyclic amines such as pyrrole, piperidine, 1,8-diazabicyclo[5,4,0]-7-undecene, 1,5-diazabicyclo[4,3,0]-5-nonane, and morpholine.

The concentration of the alkaline compound in the alkaline developer is commonly 0.01 to 50 wt %, preferably 0.02 to 1 wt %. In addition, it is possible to add a surfactant such as a nonionic surfactant at 0.1 to 5 wt % in order to further improve the shape of the pattern given by development. Furthermore, in cases where the developer is an alkali aqueous solution, the developer may be supplemented with a water-soluble organic solvent such as ethanol, γ-butyrolactone, dimethyl formamide, or N-methyl-2-pyrrolidone.

Examples of developing methods include an immersion method, spray method, paddle method, and the like. The resulting pattern may be rinsed with pure water or the like.

Heating (post-baking) the resulting pattern makes it possible to obtain a patterned colored film. The heating treatment may be performed in air, in a nitrogen atmosphere, or in vacuo. The heating temperature is preferably 150 to 300° C., and the heating time is preferably 0.25 to 5 hours. The heating temperature may be changed continuously or changed stepwise.

A black resin composition and a colored film according to the present invention have high light-blocking ability in the visible wavelength region and high transmittance in the near-infrared area, and thus can be utilized suitably for the following: a colored film for a decorative substrate in a display terminal such as a smartphone or a tablet PC; a colored film for a decorative panel for driver monitoring in an on-vehicle display or an on-vehicle instrument or for hiding a near-infrared sensor for a gesture sensor or hiding a near-infrared camera; a decorative film or a molded resin article for hiding a LiDAR sensor; a light-blocking image such as a black matrix of a color filter provided in a liquid crystal display device or the like; a colored partition wall inside an organic EL display; and the like. A light-blocking film according to the present invention, particularly as a light-blocking film in a display device such as a liquid crystal display or an organic EL display, allows a position alignment mechanism with near-infrared rays to function, and hence, can be used suitably.

EXAMPLES

Below, the present invention will be described in detail with reference to Examples and Comparative Examples, and the aspects of the present invention are not limited thereto.

<Evaluation Method>

[Crystalline Size of Pigment]

The colored film obtained in each of Examples and Comparative Examples was shaved off from the glass base plate, packed into an aluminum-made standard sample holder, and used as a crystalline size measurement sample of the pigment contained in the colored film. With these measurement samples, an X-ray diffraction spectrum was measured by wide-angle X-ray diffraction using an X-ray diffractometer DS ADVANCE (tradename) manufactured by Bruker AXS, and using CuKα rays as the X-ray source. The measurement conditions were based on an output of 40 kV/40 mA, a slit system with Div. Slit at 0.3°, a measurement step (2θ) of 0.0171°, and a measurement time of 0.5 seconds/step.

The diffraction angle and half bandwidth of the main peak derived from the pigment were measured, and the size of the crystal that constituted the pigment was determined in accordance with the Scherrer equation represented by the above-mentioned Equation (1).

[Visible-Light Transmittance Ratio $T_{555}/T_{ave}$ of Colorant]

To the colorant dispersion liquid obtained in each Production Example, the acrylic resin obtained in Synthesis Example 1 was added to produce a resin composition in such a manner that the amount of the colorant blended therein was 25 wt % with respect to the total amount of the solid components. The resin composition produced was formed to give a colored film in such a manner that the thickness of the film cured was 2 µm on the glass base plate. With this colored film, a measurement was made of the transmittance ($T_{555}$) at a wavelength of 555 nm and the average transmittance (Tave) in the range of from 450 nm to 650 nm using an ultraviolet-visible spectrophotometer UV-3150 manufactured by Shimadzu Corporation. Based on the measurement, the transmittance ratio $T_{555}$/Tave (synonymous with $T_{R1}/T_{R0}$ for a red pigment) was calculated.

[Light-Blocking Ability]

With a colored film obtained in each of Examples and Comparative Examples, the OD value per 1 µm in film thickness was calculated using an optical densitometer 361TVisual manufactured by X-Rite, Inc..

[Visible-Light-Blocking Ability and Near-Infrared Penetrability]

Using an ultraviolet-visible spectrophotometer UV-3150 manufactured by Shimadzu Corporation, the transmittance of a colored film obtained in each of Examples and Comparative Examples and having a film thickness for an OD value of 4.0 was measured at a wavelength of 400 nm to 700 nm. Then, the maximum transmittance was determined. Here, the transmittance of the coating film alone was determined using, as a reference, a glass base plate having no colored film formed thereon. The lower the maximum transmittance, the better the light-blocking ability in the visible wavelength region. In addition, a colored film obtained in each of Examples and Comparative Examples and having a film thickness for an OD value of 4.0 was used to measure, in the same manner, the transmittance in the wavelength range of from 920 nm to 960 nm. Then, the average transmittance was determined. The higher the average transmittance, the better the light penetrability in the near-infrared area.

[Haze]

The haze value of a colored film obtained in each of Examples and Comparative Examples and having a film thickness for an OD value of 2.0 was calculated in accordance with the following Equation (4) on the basis of the amount of light (the sum of [the total amount of light detected using the integrating sphere]/[the amount of light incident into the integrating sphere from the transmitting side of the integrating sphere], as obtained by scanning in a wavelength range) measured using an ultraviolet-visible spectrophotometer UV-3150 and an integrating sphere, which were manufactured by Shimadzu Corporation, wherein the light was captured in the wavelength range of from 920 nm to 960 nm by the integrating sphere configured as depicted in FIG. 2. A smaller haze value means that the transmitted light was better inhibited from scattering.

$$\text{Haze} = ((T4/T2) - (T3/T1)) \quad \text{Equation (4)}$$

T1: the amount of light captured by the integrating sphere the transmitting side of which is open and to the reflecting side of which a standard white plate composed of barium sulfate is attached T2: the amount of light captured by the integrating sphere to the transmitting side of which a measurement base plate is attached and to the reflecting side of which a standard white plate composed of barium sulfate is attached T3: the amount of light captured by the integrating sphere both the transmitting side and reflecting side of which are open T4: the amount of light captured by the integrating sphere on the transmitting side of which a measurement base plate is attached and the reflecting side of which is open

[Near-Infrared Camera Image]

An infrared-ray camera module Freemo manufactured by Alpha Technology Co., Ltd. was arranged on the back side of a colored film obtained in each of Examples and Comparative Examples, and the camera images obtained were rated on the basis of the following criteria.

A: the image is recognizable and clear.

B: the image is recognizable, but the outline is unclear.

C: the image is unrecognizable.

[Reflection Chromaticity]

The reflection chromaticity (L*,a*,b*) of a colored film obtained in each of Examples and Comparative Examples was evaluated by measuring the total reflection chromaticity (SCI) and diffused reflection chromaticity (SCE) to light incident from a transparent base material under measurement conditions based on a standard light source D65 (having a color temperature of 6504K), a viewing angle of 2° (CIE1976), atmospheric pressure, and 20° C., using a spectrocolorimeter (CM-2600d manufactured by Konica Minolta, Inc.) calibrated with a white color calibration plate (CM-A145 manufactured by Konica Minolta, Inc.).

Synthesis Example 1: Synthesis of Acrylic Resin (P-1)

A copolymer of methyl methacrylate, methacrylic acid, and styrene (at a weight ratio of 30:40:30) was synthesized in accordance with the method described in Example 1 in JP 3120476 B. To 100 parts by weight of the resulting copolymer, 40 parts by weight of glycidyl methacrylate was added, and the resulting mixture was redeposited with purified water, filtrated, and dried to obtain an alkali-soluble acrylic resin (P-1) having a weight-average molecular weight of 15,000 and an acid value of 110 mgKOH/g. In this regard, the acid value (unit: mgKOH/g) of the acrylic resin was the amount (mg) of potassium hydroxide used to neutralize 1 g of the acrylic resin. The weight-average molecular weight was measured in terms of polystyrene by gel permeation chromatography (GPC) using an "HLC-8220GPC" (a testing device manufactured by Tosoh Corporation) and using tetrahydrofuran as a carrier.

Production Example 1: Production of Red Pigment PR254-1

Into a kneader (an S-type Kneader (tradename) manufactured by Moriyama Works), 200 g of "Irgazin DPP Red 2030" (PR254) manufactured by BASF SE, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a red pigment PR254-1.

Production Example 2: Production of Red Pigment PR177-1

Into a kneader (an S-type Kneader (tradename) manufactured by Moriyama Works), 200 g of "Cromophtal Red A3B" (PR177) manufactured by BASF SE, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a red pigment PR177-1.

Production Example 3: Production of Red Pigment PR179-1

Into a kneader (an S-type Kneader (tradename) manufactured by Moriyama Works), 200 g of "Hostaperm Red P2GL-WD" (PR179) manufactured by Clariant AG, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a red pigment PR179-1.

Production Example 4: Production of Red Pigment PR264-1

Into a kneader (an S-type Kneader (tradename) manufactured by Moriyama Works), 200 g of "Irgazin DPP Red Ultra Opaque" (PR264) manufactured by BASF SE, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a red pigment PR264-1.

Production Example 5: Production of Red Pigment PR122-1

Into a kneader (an S-type Kneader (tradename) manufactured by Moriyama Works), 200 g of "Hostaperm Pink EB transp" (PR122) manufactured by Clariant AG, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a red pigment PR122-1.

Production Example 6: Production of Blue Pigment PB15:6-1

Into a kneader (an S-type Kneader (tradename) manufactured by Moriyama Works), 200 g of "LIONOL BLUE ES" (PB15:6-1) manufactured by Toyocolor Co., Ltd., 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a blue pigment PB15:6-1.

Production Example 7: Production of Yellow Pigment PY138-1

Into a kneader (an S-type Kneader (tradename) manufactured by Moriyama Works), 200 g of "PALIOTOR YELLOW K0961 HD" (PY138) manufactured by BASF SE, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a yellow pigment PY138-1.

Production Example 8: Production of Yellow Pigment PY150-1

Into a kneader (an S-type Kneader (tradename) manufactured by Moriyama Works), 200 g of "E-4GN" (PY150) manufactured by Lanxess AG, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a yellow pigment PY150-1.

Production Example 9: Production of Yellow Pigment PY139-1

Into a kneader (an S-type Kneader (tradename) manufactured by Moriyama Works), 200 g of "Irgaphor YELLOW 2R-CF" (PY139) manufactured by BASF SE, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a yellow pigment PY139-1.

Production Example 10: Production of Yellow Pigment PY185-1

Into a kneader (an S-type Kneader (tradename) manufactured by Moriyama Works), 200 g of "Paliotol Yellow D1155" (PY185) manufactured by BASF SE, 2400 g of sodium chloride, and 400 g of diethylene glycol were introduced, and the resulting mixture was kneaded at 70° C. for 8 hours. Next, this material kneaded was added to approximately 10 L of warm water. The resulting mixture was stirred with a high-speed mixer under heating at 40° C. for 1 hour to become slurry, which was then filtrated and washed with water to remove sodium chloride and diethylene glycol. The resulting material was dried in vacuo at 80° C. for 24 hours to obtain a yellow pigment PY185-1.

Production Example 11: Production of Colorant Dispersion Liquid (DR-1)

Into a tank, 120 g of the above-mentioned red pigment PR254-1, 171 g of a propylene glycol monomethyl ether acetate (PGMEA) solution of 35 wt % acrylic resin (P-1) obtained in Synthesis Example 1, 20 g of an amine polymer dispersant "BYK LPN-21116" as a polymer dispersant, and 689 g of PGMEA were fed and mixed, and the resulting mixture was stirred using a homo mixer for 20 minutes to obtain a preliminary dispersion liquid. The preliminary dispersion liquid obtained was supplied into a disperser ULTRA APEX MILL UAM015 manufactured by Kotobuki Industries Co., Ltd. and equipped with a centrifugal separator that was 75 vol % filled with zirconia beads having a bead diameter of 0.50 mm. Dispersion was performed at a rotational speed of 12 m/s for 20 minutes. Subsequently, the liquid treated for dispersion was supplied into the ULTRA APEX MILL UAM015 that was 75 vol % filled with zirconia beads having a bead diameter of 0.05 mm. Dispersion was performed at a rotational speed of 8 m/s for 90 minutes to obtain a colorant dispersion liquid DR-1 having a solid concentration of 20 wt % and a colorant/(resin+polymer dispersant) ratio (weight ratio) of 60/40.

Production Example 12: production of colorant dispersion liquid (DR-2)

Into a tank, 120 g of the above-mentioned red pigment PR254-1, 171 g of a propylene glycol monomethyl ether acetate (PGMEA) solution of 35 wt % acrylic resin (P-1) obtained in Synthesis Example 1, 20 g of an amine polymer dispersant "BYK LPN-21116" as a polymer dispersant, and 689 g of PGMEA were fed and mixed, and the resulting mixture was stirred using a homo mixer for 20 minutes to obtain a preliminary dispersion liquid. Dispersion was performed for 3 hours using a paint shaker (from Toyo Seiki Seisaku-sho, Ltd.) with zirconia beads having a bead diameter of 1.0 mm, and then the resulting liquid was filtrated through a 5 μm filter to obtain a colorant dispersion liquid DR-2 having a solid concentration of 20 wt % and a colorant/(resin+polymer dispersant) ratio (weight ratio) of 60/40.

Production Example 13: Production of Colorant Dispersion Liquid (DR-3)

A colorant dispersion liquid DR-3 having a solid concentration of 20 wt % and a colorant/(resin+polymer dispersant) ratio (weight ratio) of 60/40 was obtained in the same manner as in Production Example 11 except that the red pigment PR177-1 was used in place of the red pigment PR254-1.

Production Example 14: Production of Colorant Dispersion Liquid (DR-4)

A colorant dispersion liquid DR-4 having a solid concentration of 20 wt % and a colorant/(resin+polymer dispersant) ratio (weight ratio) of 60/40 was obtained in the same manner as in Production Example 11 except that the red pigment PR179-1 was used in place of the red pigment PR254-1.

Production Example 15: Production of Colorant Dispersion Liquid (DR-5)

A colorant dispersion liquid DR-5 having a solid concentration of 20 wt % and a colorant/(resin+polymer dispersant) ratio (weight ratio) of 60/40 was obtained in the same manner as in Production Example 11 except that the red pigment PR264-1 was used in place of the red pigment PR254-1.

Production Example 16: Production of Colorant Dispersion Liquid (DR-6)

A colorant dispersion liquid DR-6 having a solid concentration of 20 wt % and a colorant/(resin+polymer dispersant) ratio (weight ratio) of 60/40 was obtained in the same manner as in Production Example 11 except that the red pigment PR122-1 was used in place of the red pigment PR254-1.

Production Example 17: Production of Colorant Dispersion Liquid (DB-1)

A colorant dispersion liquid DB-1 having a solid concentration of 20 wt % and a colorant/(resin+polymer dispersant) ratio (weight ratio) of 60/40 was obtained in the same manner as in Production Example 11 except that the blue pigment PB15:6-1 was used in place of the red pigment PR254-1.

Production Example 18: Production of Colorant Dispersion Liquid (DB-2)

A colorant dispersion liquid DB-2 having a solid concentration of 20 wt % and a colorant/(resin+polymer dispersant) ratio (weight ratio) of 60/40 was obtained in the same manner as in Production Example 12 except that the blue pigment PB15:6-1 was used in place of the red pigment PR254-1.

Production Example 19: Production of Colorant Dispersion Liquid (DY-1)

A colorant dispersion liquid DY-1 having a solid concentration of 20 wt % and a colorant/(resin+polymer dispersant) ratio (weight ratio) of 60/40 was obtained in the same manner as in Production Example 11 except that the yellow pigment PY138-1 was used in place of the red pigment PR254-1.

Production Example 20: Production of Colorant Dispersion Liquid (DY-2)

A colorant dispersion liquid DY-2 having a solid concentration of 20 wt % and a colorant/(resin+polymer dispersant) ratio (weight ratio) of 60/40 was obtained in the same manner as in Production Example 12 except that the yellow pigment PY138-1 was used in place of the red pigment PR254-1.

Production Example 21: Production of Colorant Dispersion Liquid (DY-3)

A colorant dispersion liquid DY-3 having a solid concentration of 20 wt % and a colorant/(resin+polymer dispersant)

ratio (weight ratio) of 60/40 was obtained in the same manner as in Production Example 11 except that the yellow pigment PY150-1 was used in place of the red pigment PR254-1.

Production Example 22: Production of Colorant Dispersion Liquid (DY-4)

A colorant dispersion liquid DY-4 having a solid concentration of 20 wt % and a colorant/(resin+polymer dispersant) ratio (weight ratio) of 60/40 was obtained in the same manner as in Production Example 11 except that the yellow pigment PY139-1 was used in place of the red pigment PR254-1.

Production Example 23: Production of Colorant Dispersion Liquid (DY-5)

A colorant dispersion liquid DY-5 having a solid concentration of 20 wt % and a colorant/(resin+polymer dispersant) ratio (weight ratio) of 60/40 was obtained in the same manner as in Production Example 11 except that the yellow pigment PY185-1 was used in place of the red pigment PR254-1.

Production Example 24: Production of Colorant Dispersion Liquid (DK-1)

Into a tank, 120 g of carbon black the surface of which was modified with a sulfonic group (TPK1227 (BK-1) manufactured by Cabot Corporation), 171 g of a propylene glycol monomethyl ether acetate (PGMEA) solution of 35 wt % acrylic resin (P-1) obtained in Synthesis Example 1, 20 g of a polyamide polymer dispersant "DISPERBYK" 2200 (BYK-2200) as a polymer dispersant, and 689 g of PGMEA were fed and mixed, and the resulting mixture was stirred using a homo mixer for 20 minutes to obtain a preliminary dispersion liquid. The preliminary dispersion liquid obtained was supplied into a disperser ULTRA APEX MILL UAM015 manufactured by Kotobuki Industries Co., Ltd. and equipped with a centrifugal separator that was 75 vol % filled with zirconia beads having a bead diameter of 0.30 mm. Dispersion was performed at a rotational speed of 12 m/s for 20 minutes. Subsequently, the liquid treated for dispersion was supplied into the ULTRA APEX MILL UAM015 that was 75 vol % filled with zirconia beads having a bead diameter of 0.05 mm. Dispersion was performed at a rotational speed of 8 m/s for 90 minutes to obtain a colorant dispersion liquid DK-1 having a solid concentration of 20 wt % and a colorant/(resin+polymer dispersant) ratio (weight ratio) of 60/40.

Production Example 25: Production of Colorant Dispersion Liquid (DK-2)

A colorant dispersion liquid DK-2 having a solid concentration of 20 wt % and a colorant/(resin+polymer dispersant) ratio (weight ratio) of 60/40 was obtained in the same manner as in Production Example 24 except that a black organic pigment "Irgaphor" Black S0100CF (BK-2) manufactured by BASF SE was used in place of the carbon black.

The compositions and dispersion conditions in Production Examples 11 to 25 are listed in Table 1.

TABLE 1

| | | (A) Resin | (B) Colorant | (C) Organic solvent | Dispersant | Dispersion conditions |
|---|---|---|---|---|---|---|
| Colorant dispersion liquid 1 | DR-1 | P-1 | PR254-1 | PGMEA | BYK LPN-21116 | beads 0.5 mm in diameter: 12 m/s × 20 min. + beads 0.05 mm in diameter: 8 m/s × 90 min. |
| Colorant dispersion liquid 2 | DR-2 | P-1 | PR254-1 | PGMEA | BYK LPN-21116 | beads 1.0 mm in diameter: paint shaker × 3 hours |
| Colorant dispersion liquid 3 | DR-3 | P-1 | PR177-1 | PGMEA | BYK LPN-21116 | beads 0.5 mm in diameter: 12 m/s × 20 min. + beads 0.05 mm in diameter: 8 m/s × 90 min. |
| Colorant dispersion liquid 4 | DR-4 | P-1 | PR179-1 | PGMEA | BYK LPN-21116 | beads 0.5 mm in diameter: 12 m/s × 20 min. + beads 0.05 mm in diameter: 8 m/s × 90 min. |
| Colorant dispersion liquid 5 | DR-5 | P-1 | PR264-1 | PGMEA | BYK LPN-21116 | beads 0.5 mm in diameter: 12 m/s × 20 min. + beads 0.05 mm in diameter: 8 m/s × 90 min. |
| Colorant dispersion liquid 6 | DR-6 | P-1 | PR122-1 | PGMEA | BYK LPN-21116 | beads 0.5 mm in diameter: 12 m/s × 20 min. + beads 0.05 mm in diameter: 8 m/s × 90 min. |
| Colorant dispersion liquid 7 | DB-1 | P-1 | PB15:6-1 | PGMEA | BYK LPN-21116 | beads 0.5 mm in diameter: 12 m/s × 20 min. + beads 0.05 mm in diameter: 8 m/s × 90 min. |
| Colorant dispersion liquid 8 | DB-2 | P-1 | PB15:6-1 | PGMEA | BYK LPN-21116 | beads 1.0 mm in diameter: paint shaker × 3 hours |
| Colorant dispersion liquid 9 | DY-1 | P-1 | PY138-1 | PGMEA | BYK LPN-21116 | beads 0.5 mm in diameter: 12 m/s × 20 min. + beads 0.05 mm in diameter: 8 m/s × 90 min. |
| Colorant dispersion liquid 10 | DY-2 | P-1 | PY138-1 | PGMEA | BYK LPN-21116 | beads 1.0 mm in diameter: paint shaker × 3 hours |
| Colorant dispersion liquid 11 | DY-3 | P-1 | PY150-1 | PGMEA | BYK LPN-21116 | beads 0.5 mm in diameter: 12 m/s × 20 min. + beads 0.05 mm in diameter: 8 m/s × 90 min. |

TABLE 1-continued

| | | | | | | |
|---|---|---|---|---|---|---|
| Colorant dispersion liquid 12 | DY-4 | P-1 | PY139-1 | PGMEA | BYK LPN-21116 | beads 0.5 mm in diameter: 12 m/s × 20 min. + beads 0.05 mm in diameter: 8 m/s × 90 min. |
| Colorant dispersion liquid 13 | DY-5 | P-1 | PY185-1 | PGMEA | BYK LPN-21116 | beads 0.5 mm in diameter: 12 m/s × 20 min. + beads 0.05 mm in diameter: 8 m/s × 90 min. |
| Colorant dispersion liquid 14 | DK-1 | P-1 | BK-1 | PGMEA | BYK LPN-21116 | beads 0.5 mm in diameter: 12 m/s × 20 min. + beads 0.05 mm in diameter: 8 m/s × 90 min. |
| Colorant dispersion liquid 13 | DK-2 | P-1 | BK-2 | PGMEA | BYK LPN-21116 | beads 0.5 mm in diameter: 12 m/s × 20 min. + beads 0.05 mm in diameter: 8 m/s × 90 min. |

| | | X-ray diffraction spectrum | | | Transmittance of colorant | | |
|---|---|---|---|---|---|---|---|
| | | Diffraction angle of main peak 2θ (°) | Half bandwidth of main peak (°) | Crystalline size (nm) | Average transmittance (450-650 nm) $[T_{ave}]$ (%) | Transmittance (555 nm) $[T_{555}]$ (%) | Transmittance ratio $T_{555}/T_{ave}$ |
| Colorant dispersion liquid 1 | DR-1 | 28.28 | 0.921 | 9.0 | 32.60 | 0.23 | 0.007 |
| Colorant dispersion liquid 2 | DR-2 | 28.42 | 0.324 | 27.6 | 31.89 | 0.22 | 0.007 |
| Colorant dispersion liquid 3 | DR-3 | 12.20 | 0.435 | 19.2 | 33.35 | 4.29 | 0.129 |
| Colorant dispersion liquid 4 | DR-4 | 27.60 | 0.480 | 17.7 | 23.63 | 2.13 | 0.009 |
| Colorant dispersion liquid 5 | DR-5 | 18.74 | 1.267 | 6.4 | 24.34 | 0.82 | 0.003 |
| Colorant dispersion liquid 6 | DR-6 | 5.55 | 0.351 | 24.5 | 36.96 | 3.67 | 0.099 |
| Colorant dispersion liquid 7 | DB-1 | 9.22 | 0.516 | 16.0 | 28.93 | 4.27 | 0.147 |
| Colorant dispersion liquid 8 | DB-2 | 9.27 | 0.279 | 32.3 | 28.11 | 4.21 | 0.150 |
| Colorant dispersion liquid 9 | DY-1 | 26.00 | 0.953 | 8.6 | 84.27 | 97.97 | 1.163 |
| Colorant dispersion liquid 10 | DY-2 | 25.91 | 0.379 | 22.9 | 83.16 | 96.65 | 1.162 |
| Colorant dispersion liquid 11 | DY-3 | 8.56 | 0.462 | 18.0 | 77.35 | 95.55 | 1.235 |
| Colorant dispersion liquid 12 | DY-4 | 26.41 | 0.613 | 13.6 | 62.77 | 93.54 | 1.490 |
| Colorant dispersion liquid 13 | DY-5 | 27.07 | 1.246 | 6.6 | 73.43 | 93.93 | 1.279 |
| Colorant dispersion liquid 14 | DK-1 | — | — | — | — | — | — |
| Colorant dispersion liquid 13 | DK-2 | 7.86 | 0.350 | 24.5 | — | — | — |

Example 1

A solution in which 19.75 g of a PGMEA solution of 35 wt % acryl polymer (P-1), 7.27 g of dipentaerythritol hexaacrylate (manufactured by Nippon Kayaku Co., Ltd.) as a polyfunctional monomer, 0.38 g of KBM5103 (manufactured by Shin-Etsu Chemical Co., Ltd.) as an adhesion promoter, and 0.3 g of a PGMEA solution of 10 wt % silicone surfactant "BYK" 333 (manufactured by BYK-Chemie GmbH) as a surfactant were dissolved in 20.22 g of PGMEA was added to a liquid mixture of 20.83 g of the colorant dispersion liquid (DR-1) and 31.25 g of the colorant dispersion liquid (DB-1) to obtain a black resin composition PC-1 having a total solid concentration of 25 wt % and containing the colorant in an amount of 25 parts by weight with respect to 100 parts by weight of the total solid content.

Using a spinner (1H-DS) manufactured by Mikasa Co., Ltd., the black resin composition PC-1 obtained was applied to a non-alkali glass base plate (AN100) having a thickness of 0.7 mm. The coating film was dried under heating at 100° C. on a hot plate for 2 minutes. This dried film was post-baked at 230° C. in a hot air oven for 30 minutes to obtain a colored film C-1. The results obtained by evaluating this colored film C-1 in accordance with the above-mentioned method are tabulated in Table 2.

Example 2

A black resin composition PC-2 was obtained in the same manner as in Example 1 except that the amount of the colorant dispersion liquid (DR-1) was 31.25 g, and that the amount of the colorant dispersion liquid (DB-1) was 20.83 g. Using the black resin composition PC-2 obtained, the same evaluation as in Example 1 was performed. The results are tabulated in Table 2.

Example 3

A black resin composition PC-3 was obtained in the same manner as in Example 1 except that the amount of the colorant dispersion liquid (DR-1) was 41.66 g, and that the amount of the colorant dispersion liquid (DB-1) was 10.42 g. Using the black resin composition PC-3 obtained, the same evaluation as in Example 1 was performed. The results are tabulated in Table 2.

Example 4

A black resin composition PC-4 was obtained in the same manner as in Example 1 except that the amount of the colorant dispersion liquid (DR-1) was 26.04 g, that the amount of the colorant dispersion liquid (DB-1) was 18.23 g, and furthermore that 7.81 g of the colorant dispersion liquid (DY-1) was mixed in. Using the black resin composition PC-4 obtained, the same evaluation as in Example 1 was performed. The results are tabulated in Table 2. In addition, the X-ray diffraction profile of the colored film is illustrated in FIG. 1.

Example 5

A black resin composition PC-5 was obtained in the same manner as in Example 4 except that the colorant dispersion liquid (DR-3) was used in place of the colorant dispersion liquid (DR-1). Using the black resin composition PC-5 obtained, the same evaluation as in Example 1 was performed. The results are tabulated in Table 2.

Example 6

A black resin composition PC-6 was obtained in the same manner as in Example 4 except that the colorant dispersion liquid (DY-3) was used in place of the colorant dispersion liquid (DY-1). Using the black resin composition PC-6 obtained, the same evaluation as in Example 1 was performed. The results are tabulated in Table 2.

Example 7

A black resin composition PC-7 was obtained in the same manner as in Example 5 except that the colorant dispersion liquid (DY-3) was used in place of the colorant dispersion liquid (DY-1). Using the black resin composition PC-7 obtained, the same evaluation as in Example 1 was performed. The results are tabulated in Table 2.

Example 8

A black resin composition PC-8 was obtained in the same manner as in Example 1 except that 33.85 g of the colorant dispersion liquid (DR-4) and 18.23 g of the colorant dispersion liquid (DB-1) were mixed in. Using the black resin composition PC-8 obtained, the same evaluation as in Example 1 was performed. The results are tabulated in Table 2.

Example 9

A black resin composition PC-9 was obtained in the same manner as in Example 1 except that the amount of the colorant dispersion liquid (DR-4) was 26.04 g, that the amount of the colorant dispersion liquid (DB-1) was 18.23 g, and that 7.81 g of the colorant dispersion liquid (DY-5) was mixed in. Using the black resin composition PC-9 obtained, the same evaluation as in Example 1 was performed. The results are tabulated in Table 2.

Example 10

A black resin composition PC-10 was obtained in the same manner as in Example 7 except that the colorant dispersion liquid (DR-5) was used in place of the colorant dispersion liquid (DR-3). Using the black resin composition PC-10 obtained, the same evaluation as in Example 1 was performed. The results are tabulated in Table 2.

Example 11

A black resin composition PC-11 was obtained in the same manner as in Example 10 except that the colorant dispersion liquid (DY-4) was used in place of the colorant dispersion liquid (DY-3). Using the black resin composition PC-11 obtained, the same evaluation as in Example 1 was performed. The results are tabulated in Table 2.

Example 12

A black resin composition PC-12 was obtained in the same manner as in Example 11 except that the colorant dispersion liquid (DY-5) was used in place of the colorant dispersion liquid (DY-4). Using the black resin composition PC-12 obtained, the same evaluation as in Example 1 was performed. The results are tabulated in Table 2.

Example 13

A black resin composition PC-13 was obtained in the same manner as in Example 12 except that the colorant dispersion liquid (DR-6) was used in place of the colorant dispersion liquid (DR-5). Using the black resin composition PC-13 obtained, the same evaluation as in Example 1 was performed. The results are tabulated in Table 2.

Example 14

A black resin composition PC-14 was obtained in the same manner as in Example 4 except that the colorant dispersion liquid (DB-2) was used in place of the colorant dispersion liquid (DB-1). Using the black resin composition PC-14 obtained, the same evaluation as in Example 1 was performed. The results are tabulated in Table 2.

Example 15

The colorant dispersion liquid (DR-1) in an amount of 10.42 g, 7.29 g of the colorant dispersion liquid (DB-1), and 3.12 g of the colorant dispersion liquid (DY-1) were mixed. To the resulting mixture, a solution in which 32.35 g of a PGMEA solution of 35 wt % acryl polymer (P-1), 9.10 g of dipentaerythritol hexaacrylate (manufactured by Nippon Kayaku Co., Ltd.) as a polyfunctional monomer, 0.38 g of KBM5103 (manufactured by Shin-Etsu Chemical Co., Ltd.) as an adhesion promoter, and 0.3 g of a PGMEA solution of 10 wt % silicone surfactant "BYK" 333 (manufactured by BYK-Chemie GmbH) as a surfactant were dissolved in 37.03 g of PGMEA was added to obtain a black resin composition PC-15 having a total solid concentration of 25 wt % and containing the colorant in an amount of 10 parts by weight with respect to 100 parts by weight of the total solid content. Using the black resin composition PC-15 obtained, the same evaluation as in Example 1 was performed. The results are tabulated in Table 2.

Example 16

The colorant dispersion liquid (DR-1) in an amount of 41.67 g, 29.16 g of the colorant dispersion liquid (DB-1), and 12.50 g of the colorant dispersion liquid (DY-1) were mixed. To the resulting mixture, a solution in which 7.14 g of a PGMEA solution of 35 wt % acryl polymer (P-1), 5.43 g of dipentaerythritol hexaacrylate (manufactured by Nippon Kayaku Co., Ltd.) as a polyfunctional monomer, 0.38 g of KBM5103 (manufactured by Shin-Etsu Chemical Co., Ltd.) as an adhesion promoter, and 0.3 g of a PGMEA solution of 10 wt % silicone surfactant "BYK" 333 (manufactured by BYK-Chemie GmbH) as a surfactant were dissolved in 3.42 g of PGMEA was added to obtain a black resin composition PC-16 having a total solid concentration of 25 wt % and containing the colorant in an amount of 40 parts by weight with respect to 100 parts by weight of the total solid content. Using the black resin composition PC-16 obtained, the same evaluation as in Example 1 was performed. The results are tabulated in Table 2.

Comparative Example 1

A black resin composition PC-17 was obtained in the same manner as in Example 1 except that the amount of the colorant dispersion liquid (DR-1) was 5.21 g, and that the amount of the colorant dispersion liquid (DB-1) was 46.87 g. Using the black resin composition PC-17 obtained, the same evaluation as in Example 1 was performed. The results are tabulated in Table 2.

Comparative Example 2

A black resin composition PC-18 was obtained in the same manner as in Example 1 except that the amount of the colorant dispersion liquid (DR-1) was 46.87 g, and that the amount of the colorant dispersion liquid (DB-1) was 5.21 g. Using the black resin composition PC-18 obtained, the same evaluation as in Example 1 was performed. The results are tabulated in Table 2.

Comparative Example 3

A black resin composition PC-19 was obtained in the same manner as in Example 4 except that the colorant dispersion liquid (DR-2), the colorant dispersion liquid (DB-2), and the colorant dispersion liquid (DY-2) were used in place of the colorant dispersion liquid (DR-1), the colorant dispersion liquid (DB-1), and the colorant dispersion liquid (DY-1) respectively. Using the black resin composition PC-19 obtained, the same evaluation as in Example 1 was performed. The results are tabulated in Table 2. In addition, the X-ray diffraction profile of the colored film is illustrated in FIG. 1.

Comparative Example 4

A black resin composition PC-20 was obtained in the same manner as in Example 4 except that the colorant dispersion liquid (DR-2) was used in place of the colorant dispersion liquid (DR-1). Using the black resin composition PC-20 obtained, the same evaluation as in Example 1 was performed. The results are tabulated in Table 2.

Reference Example 1

A black resin composition PC-21 was obtained in the same manner as in Example 1 except that 52.08 g of the colorant dispersion liquid (DK-1) was used in place of the colorant dispersion liquid (DR-1) and the colorant dispersion liquid (DB-1). Using the black resin composition PC-21 obtained, the same evaluation as in Example 1 was performed. The results are tabulated in Table 2.

Reference Example 2

A black resin composition PC-22 was obtained in the same manner as in Example 3 except that the colorant dispersion liquid (DK-2) was used in place of the colorant dispersion liquid (DR-1). Using the black resin composition PC-22 obtained, the same evaluation as in Example 1 was performed. The results are tabulated in Table 2.

TABLE 2

| | Colored resin composition | Colored resin composition | | | | | | | | |
|---|---|---|---|---|---|---|---|---|---|---|
| | | | Colorant dispersion liquid | | | | | | | |
| | composition | (A) resin | DR-1 | DR-2 | DR-3 | DR-4 | DR-5 | DR-6 | DB-1 | DB-2 |
| Example 1 | PC-1 | P-1 | 40 wt % | | | | | | 60 wt % | |
| Example 2 | PC-2 | P-1 | 60 wt % | | | | | | 40 wt % | |
| Example 3 | PC-3 | P-1 | 80 wt % | | | | | | 20 wt % | |
| Example 4 | PC-4 | P-1 | 50 wt % | | | | | | 35 wt % | |
| Example 5 | PC-5 | P-1 | | | 50 wt % | | | | 35 wt % | |
| Example 6 | PC-6 | P-1 | 50 wt % | | | | | | 35 wt % | |

TABLE 2-continued

| | | | | | | | |
|---|---|---|---|---|---|---|---|
| Example 7 | PC-7 | P-1 | | | 50 wt % | | 35 wt % |
| Example 8 | PC-8 | P-1 | | | | 65 wt % | 35 wt % |
| Example 9 | PC-9 | P-1 | | | | 50 wt % | 35 wt % |
| Example 10 | PC-10 | P-1 | | | | 50 wt % | 35 wt % |
| Example 11 | PC-11 | P-1 | | | | 50 wt % | 35 wt % |
| Example 12 | PC-12 | P-1 | | | | 50 wt % | 35 wt % |
| Example 13 | PC-13 | P-1 | | | | | 50 wt % | 35 wt % |
| Example 14 | PC-14 | P-1 | 50 wt % | | | | 35 wt % |
| Example 15 | PC-15 | P-1 | 50 wt % | | | | 35 wt % |
| Example 16 | PC-16 | P-1 | 50 wt % | | | | 35 wt % |
| Comparative Example 1 | PC-17 | P-1 | 10 wt % | | | | 90 wt % |
| Comparative Example 2 | PC-18 | P-1 | 90 wt % | | | | 10 wt % |
| Comparative Example 3 | PC-19 | P-1 | | 50 wt % | | | 35 wt % |
| Comparative Example 4 | PC-20 | P-1 | | 50 wt % | | | 35 wt % |
| Reference Example 1 | PC-21 | P-1 | | | | | |
| Reference Example 2 | PC-22 | P-1 | | | | | 20 wt % |

| | Colored resin composition | | | | | | | | |
|---|---|---|---|---|---|---|---|---|---|
| | Colorant dispersion liquid | | | | | | | Amount of | (C) Organic |
| | DY-1 | DY-2 | DY-3 | DY-4 | DY-5 | DK-1 | DK-2 | colorant[X-1] | solvent |
| Example 1 | | | | | | | | 25 parts by weight | PGMEA |
| Example 2 | | | | | | | | 25 parts by weight | PGMEA |
| Example 3 | | | | | | | | 25 parts by weight | PGMEA |
| Example 4 | 15 wt % | | | | | | | 25 parts by weight | PGMEA |
| Example 5 | 15 wt % | | | | | | | 25 parts by weight | PGMEA |
| Example 6 | | | 15 wt % | | | | | 25 parts by weight | PGMEA |
| Example 7 | | | 15 wt % | | | | | 25 parts by weight | PGMEA |
| Example 8 | | | | | | | | 25 parts by weight | PGMEA |
| Example 9 | | | | | 15 wt % | | | 25 parts by weight | PGMEA |
| Example 10 | | | 15 wt % | | | | | 25 parts by weight | PGMEA |
| Example 11 | | | | 15 wt % | | | | 25 parts by weight | PGMEA |
| Example 12 | | | | | 15 wt % | | | 25 parts by weight | PGMEA |
| Example 13 | | | | | 15 wt % | | | 25 parts by weight | PGMEA |
| Example 14 | 15 wt % | | | | | | | 25 parts by weight | PGMEA |
| Example 15 | 15 wt % | | | | | | | 10 parts by weight | PGMEA |
| Example 16 | 15 wt % | | | | | | | 40 parts by weight | PGMEA |
| Comparative Example 1 | | | | | | | | 25 parts by weight | PGMEA |
| Comparative Example 2 | | | | | | | | 25 parts by weight | PGMEA |
| Comparative Example 3 | | 15 wt % | | | | | | 25 parts by weight | PGMEA |
| Comparative Example 4 | 15 wt % | | | | | | | 25 parts by weight | PGMEA |
| Reference Example 1 | | | | | | 100 wt % | | 25 parts by weight | PGMEA |
| Reference Example 2 | | | | | | | 80 wt % | 25 parts by weight | PGMEA |

| | | Light-blocking ability | Transmittance (OD = 4) | | Haze value | Near-infrared camera | Reflection chromaticity (SCI) | | | Reflection chromaticity (SCE) | | |
|---|---|---|---|---|---|---|---|---|---|---|---|---|
| | | OD value/μm | Visible light | Near-infrared light (Glass) | (OD = 2.0) | image | L* | a* | b* | L* | a* | b* |
| Example 1 | PC-1 | 0.80 | 1.0% | 95.3% | 0.30% | A | 25.2 | 0.85 | −0.42 | 0.8 | 0.38 | 0.54 |
| Example 2 | PC-2 | 0.77 | 0.6% | 96.7% | 0.20% | A | 25.4 | 0.48 | 0.18 | 0.98 | 0.24 | 0.89 |
| Example 3 | PC-3 | 0.45 | 0.5% | 96.9% | 0.20% | A | 25.4 | 0.19 | 0.45 | 0.68 | 0.15 | 0.99 |
| Example 4 | PC-4 | 0.60 | 0.6% | 97.5% | 0.10% | A | 25.3 | 0.42 | −0.04 | 0.77 | 0.2 | 0.79 |
| Example 5 | PC-5 | 0.66 | 0.9% | 96.3% | 0.20% | A | 25.2 | 0.34 | −0.39 | 0.63 | −0.02 | 0.57 |
| Example 6 | PC-6 | 0.70 | 0.6% | 96.7% | 0.20% | A | 25.2 | 0.34 | −0.27 | 0.46 | 0.13 | 0.34 |
| Example 7 | PC-7 | 0.50 | 0.1% | 96.1% | 0.10% | A | 25.3 | 0.39 | −0.48 | 0.82 | 0.04 | 0.21 |
| Example 8 | PC-8 | 0.71 | 0.5% | 96.1% | 0.10% | A | 25.6 | 0.29 | −0.28 | 0.95 | −0.07 | 0.3 |
| Example 9 | PC-9 | 0.68 | 0.1% | 98.0% | 0.21% | A | 25.4 | 0.37 | 0.09 | 0.98 | −0.12 | 1.36 |
| Example 10 | PC-10 | 0.69 | 0.2% | 97.2% | 0.10% | A | 25.3 | 0.32 | −0.26 | 0.74 | 0.17 | 0.79 |
| Example 11 | PC-11 | 0.70 | 0.1% | 97.0% | 0.10% | A | 25.4 | 0.24 | −0.31 | 0.79 | −0.02 | 0.66 |
| Example 12 | PC-12 | 0.70 | 0.1% | 97.1% | 0.10% | A | 25.2 | 0.28 | −0.25 | 0.71 | 0.08 | 0.76 |
| Example 13 | PC-13 | 0.42 | 0.1% | 94.3% | 0.40% | A | 25.7 | 0.04 | −0.25 | 2.28 | −1.07 | 1.18 |
| Example 14 | PC-14 | 0.68 | 0.5% | 95.5% | 1.40% | B | 25.3 | 0.39 | −0.26 | 0.51 | 0.45 | 0.64 |

TABLE 2-continued

| | | | | | | | | | | | | |
|---|---|---|---|---|---|---|---|---|---|---|---|---|
| Example 15 | PC-15 | 0.25 | 0.4% | 97.1% | 0.10% | A | 25.0 | 0.26 | −0.44 | 1.1 | 0.29 | 0.91 |
| Example 16 | PC-16 | 1.11 | 0.4% | 95.6% | 0.60% | A | 25.7 | 0.56 | 0.39 | 0.63 | 0.1 | 0.88 |
| Comparative Example 1 | PC-17 | 0.37 | 0.9% | 88.4% | 0.20% | B | 25.3 | 1.17 | −0.31 | 0.57 | 1.12 | 0.36 |
| Comparative Example 2 | PC-18 | 0.19 | 0.2% | 97.7% | 0.40% | A | 25.4 | 0.02 | 0.24 | 1.19 | 0.28 | 1.33 |
| Comparative Example 3 | PC-19 | 0.74 | 0.4% | 90.2% | 4.50% | C | 26.6 | 0.36 | 1.13 | 5 | −0.15 | 5.13 |
| Comparative Example 4 | PC-20 | 0.78 | 0.4% | 92.2% | 3.20% | C | 26.7 | 0.31 | 1.25 | 5.37 | −0.57 | 5.4 |
| Reference Example 1 | PC-21 | 2.01 | 0.0% | 0.3% | 1.00% | C | 26.3 | 0.11 | −0.23 | 1.47 | −0.33 | −0.11 |
| Reference Example 2 | PC-22 | 0.80 | 0.4% | 94.6% | 0.60% | A | 25.5 | 0.57 | −0.32 | 0.98 | 0.03 | 0.37 |

The black resin compositions in Examples have been found to have a low maximum transmittance in the visible wavelength region, a high average transmittance in the near-infrared area, and furthermore, good reflection chromaticity. The haze has been found to be low. On the other hand, the black resin compositions containing the red pigment at a smaller ratio with respect to the total amount of the colorants yielded the results that the reflection chromaticity a* value was large, that the image reflected in the colored film had a reddish tinge, and that the infrared-ray camera image obtained was dark. On the other hand, the black resin compositions containing the red pigment at a larger ratio with respect to the total amount of the colorants yielded the results that the light-blocking ability per unit film thickness was low, thus causing the film thickness for an OD value of 4 to be large, that the reflection chromaticity b* value was large, and that the image reflected in the colored film had a yellowish tinge. In addition, the black resin composition in which the red pigment had a large crystalline size had a low average transmittance in the near-infrared area and a large reflection chromaticity b* value. The image reflected in the colored film had a yellowish tinge. Furthermore, the haze was high, and the near-infrared camera image obtained was unclear.

INDUSTRIAL APPLICABILITY

A black resin composition according to the present invention can be utilized suitably as a black decorative ink for forming a near-infrared-transmitting light-blocking film suited to hide a near-infrared camera and a near-infrared sensor.

The invention claimed is:

1. A colored film comprising a cured black resin composition formed from an uncured black resin composition comprising components (A) a resin, (B) a colorant, and (C) an organic solvent,
    wherein said (B) colorant includes a red pigment and a blue pigment,
    wherein an amount of said red pigment is 20 to 80 wt % with respect to the total amount of said (B) colorant, and
    wherein a crystalline size of said red pigment in the colored film is 5 nm or more and 25 nm or less, as calculated from a half bandwidth determined from a main peak of an X-ray diffraction spectrum obtained using CuKα rays as an X-ray source.

2. The colored film according to claim 1, wherein a ratio $T_{R1}/T_{R0}$ is 0.001 or more and 0.10 or less, wherein TRI is a transmittance of said red pigment at a wavelength of 555 nm, and $T_{R0}$ is an average transmittance of said red pigment in the wavelength range of from 450 to 650 nm.

3. The colored film according to claim 1, wherein said (B) colorant contains said red pigment in an amount of 45 to 65 wt % and said blue pigment in an amount of 30 to 50 wt % with respect to the total amount of said colorant.

4. The colored film according to claim 1, wherein said (B) colorant further contains at least one yellow pigment in an amount of 5 to 25 wt % in the whole colorant.

5. The uncured black resin composition according to claim 1, wherein the amount of said (B) colorant is 10 to 35 wt % with respect to the total amount of solid components.

6. The uncured black resin composition according to claim 1, comprising an alkali-soluble resin as said (A) resin, and further comprising a photoinitiator and a radical polymerizable compound.

7. The colored film according to claim 1, wherein said colored film has an average transmittance of 96% or more in a wavelength range of from 920 nm to 960 nm when an optical density (OD value) of said colored film is 4.

8. The colored film according to claim 1, wherein an optical density (OD value) per 1 μm of said colored film is 0.5 or more.

9. The colored film according to claim 1, wherein said colored film having a film thickness of 1.0 μm on a non-alkali glass having a thickness of 0.7 mm has a chromaticity value (a*, b*) of −0.5≤a*≤0.5 and −1.0≤b*≤0.4 on the basis of the CIE1976 (L*, a*, b*) color system, as where the value is measured on the glass side of said colored film in accordance with the SCI method.

10. The colored film according to claim 1, wherein said colored film having a film thickness of 1.0 μm on a non-alkali glass having a thickness of 0.7 mm has a brightness value L* of 0.01≤L*≤1.0 on the basis of the CIE1976 (L*, a*, b*) color system, where the value is measured on the glass side of said colored film in accordance with the SCE method.

11. A cured black resin composition formed from an uncured black resin composition comprising components (A) a resin, (B) a colorant, and (C) an organic solvent,
    wherein said (B) colorant includes a red pigment and a blue pigment,
    wherein an amount of said red pigment is 20 to 80 wt % with respect to the total amount of said (B) colorant, and
    wherein a crystalline size of said red pigment in a colored film formed of said cured black resin composition is 5 nm or more and 25 nm or less, as calculated from a half bandwidth determined from a main peak of an X-ray diffraction spectrum obtained using CuKα rays as an X-ray source.

12. A near-infrared-transmitting light-blocking film comprising said cured black resin composition according to claim 11.

13. A decorative substrate comprising a substrate and said near-infrared-transmitting light-blocking film according to claim 12.

14. A decorative substrate comprising a film and said near-infrared-transmitting light- blocking film according to claim 12.

15. A colored partition wall for an organic EL display, comprising said near-infrared- transmitting light-blocking film according to claim 12.

* * * * *